United States Patent
Sameshima et al.

(10) Patent No.: US 11,584,830 B2
(45) Date of Patent: Feb. 21, 2023

(54) PRODUCTION METHOD FOR CONDUCTIVE COMPOSITE MATERIAL

(71) Applicants: SHIBAURA MACHINE CO., LTD., Tokyo (JP); HSP TECHNOLOGIES INC., Ibaraki (JP)

(72) Inventors: Takafumi Sameshima, Numazu (JP); Yoshio Iizuka, Gotenba (JP); Kaho Osada, Gotenba (JP); Hiroshi Shimizu, Tsukuba (JP)

(73) Assignees: SHIBAURA MACHINE CO., LTD., Tokyo (JP); HSP TECHNOLOGIES INC., Ibaraki (JP)

( * ) Notice: Subject to any disclaimer, the term of this patent is extended or adjusted under 35 U.S.C. 154(b) by 847 days.

(21) Appl. No.: 16/412,438

(22) Filed: May 15, 2019

(65) Prior Publication Data
US 2019/0352472 A1 Nov. 21, 2019

(30) Foreign Application Priority Data

May 15, 2018 (JP) .............................. JP2018-093810

(51) Int. Cl.
*C08J 3/20* (2006.01)
*C08K 3/04* (2006.01)
(Continued)

(52) U.S. Cl.
CPC ............. *C08J 3/203* (2013.01); *C08F 212/08* (2013.01); *C08F 236/10* (2013.01); *C08K 3/04* (2013.01);
(Continued)

(58) Field of Classification Search
CPC ........................................................ C08J 3/203
See application file for complete search history.

(56) References Cited

U.S. PATENT DOCUMENTS

| | | |
|---|---|---|
| 2009/0230223 A1 | 9/2009 | Stall et al. |
| 2010/0283000 A1 | 11/2010 | Shimizu et al. |
| (Continued) | | |

FOREIGN PATENT DOCUMENTS

| | | |
|---|---|---|
| CN | 101778903 | 7/2010 |
| CN | 106457645 | 2/2017 |
| (Continued) | | |

OTHER PUBLICATIONS

"Office Action of Japan Counterpart Application", dated Apr. 12, 2022, with English translation thereof, pp. 1-9.
(Continued)

*Primary Examiner* — William D Young
(74) *Attorney, Agent, or Firm* — JCIP Global Inc.

(57) ABSTRACT

In a production method for a conductive composite material for an extruder that continuously discharges a kneaded product produced by kneading a raw material using a screw, the screw has a the screw body, the raw material transported along an outer circumferential surface of the screw body receives increased pressure by a barrier part in a transport part and is introduced to a passage from an inlet, and while the kneaded product is continuously discharged, the raw material transported along the outer circumferential surface of the screw body flows in the passage of the extruder and then is guided to the transport part via an outlet provided in the screw body, the raw material contains a conductive filler and a thermoplastic elastomer.

7 Claims, 25 Drawing Sheets

(51) Int. Cl.
*C08F 212/08* (2006.01)
*C08F 236/10* (2006.01)
*H01B 1/24* (2006.01)
*B29K 105/16* (2006.01)
*B29K 9/06* (2006.01)
*B29K 507/04* (2006.01)
*B29C 48/88* (2019.01)

(52) U.S. Cl.
CPC .............. *C08K 3/041* (2017.05); *H01B 1/24* (2013.01); *B29C 48/919* (2019.02); *B29K 2009/06* (2013.01); *B29K 2105/162* (2013.01); *B29K 2507/04* (2013.01); *B29K 2995/0005* (2013.01); *C08K 2201/001* (2013.01); *C08K 2201/011* (2013.01)

(56) References Cited

U.S. PATENT DOCUMENTS

2013/0069013 A1    3/2013    Esseghir
2017/0050366 A1*   2/2017    Kobayashi ............ B29C 48/767

FOREIGN PATENT DOCUMENTS

| | | |
|---|---|---|
| JP | 2005313608 | 11/2005 |
| JP | 2008266577 | 11/2008 |
| JP | 2009013323 | 1/2009 |
| JP | 2015227052 | 12/2015 |
| JP | 2015227053 | 12/2015 |
| JP | 2017133042 | 8/2017 |
| TW | 201615278 | 5/2016 |
| WO | 2006106687 | 10/2006 |
| WO | 2013111862 | 8/2013 |

OTHER PUBLICATIONS

Office Action of China Counterpart Application, with English translation thereof, dated Dec. 31, 2021, pp. 1-15.
Office Action of Taiwan Counterpart Application, with English translation thereof, dated Aug. 16, 2022, pp. 1-17.
"Office Action of Japan Counterpart Application", dated Jun. 14, 2022, with English translation thereof, p. 1-p. 7.
"Office Action of China Counterpart Application", dated Jul. 13, 2022, with English translation thereof, pp. 1-13.
"Office Action of Japan Counterpart Application", dated Aug. 9, 2022, with English translation thereof, pp. 1-4.
Office Action of Taiwan Counterpart Application, with English translation thereof, dated Nov. 22, 2022, pp. 1-14.
Office Action of China Counterpart Application, with English translation thereof, dated Nov. 24, 2022, pp. 1-18.

* cited by examiner

US 11,584,830 B2

PRODUCTION METHOD FOR CONDUCTIVE COMPOSITE MATERIAL

CROSS REFERENCE TO RELATED APPLICATIONS

The application claims priority under 35 U.S.C. § 119 to Japanese Patent Application No. 2018-093810 filed on May 15, 2018, the entire content of which is incorporated herein by reference and made a part of this specification.

BACKGROUND

Technical Field

The disclosure relates to a production method for a conductive composite material made of a conductive filler and a thermoplastic elastomer as a raw material and used a kneader equipped with an extruder that kneads the raw materials while applying shearing and extension actions thereto.

Description of Related Art

Various conductive fillers such as metal-based, metal oxide-based, and carbon-based fillers have been used to give conductivity to resins in recent years. Among carbon-based conductive fillers, carbon nanotubes (which will also be appropriately referred to as "CNTs" below) have gained attention due to their unique characteristics. Patent Document 1 (Japanese Patent Laid-Open No. 2017-133042), for example, describes a conductive composition including expanded graphite, CNTs, and polymer compounds. Although the document describes a method of dispersing carbon nanotubes in a solvent in which a polymer compound has been dissolved, mixing the solvent with expanded graphite, and then removing the solvent as a production method for a conductive composition, the production method results in low productivity.

Patent Document 2 (Japanese Patent Laid-Open No. 2008-266577) describes a melt-kneading method of uniformly dispersing CNTs in a thermoplastic resin at a nanolevel by creating a high shear flow state. Although the method described in the document results in higher productivity than the production method described in Patent Document 1, it is not appropriate for continuous production of a resin composition.

Patent Document 3 (Japanese Patent Laid-Open No. 2015-227052) discloses a kneader and a kneading method that enable continuous production of a kneaded product keeping consistent quality by continuously transporting processing objects in a kneading process in which a molten material is used as a raw material.

According to the kneader and kneading method described in Patent Document 3, resin compositions can be continuously produced. However, while the document describes that a transparent kneaded product can be obtained by kneading a molten material formed of resin materials of two types including a polycarbonate (PC) resin and a polymethyl methacrylate (PMMA) resin, it gives no description of a production method for a conductive composite material by kneading a conductive filler and a thermoplastic elastomer.

SUMMARY

According to an embodiment of the disclosure, there is a production method for a conductive composite material in which an extruder continuously discharges a kneaded product produced by kneading a raw material using a screw, wherein the screw has a screw body rotating with respect to a linear axis as a center along a transport direction of the raw material, a passage in which the raw material flowing from an inlet that is opened on an outer circumferential surface of the screw body flows is provided inside the screw body, a pressure of the raw material transported along the outer circumferential surface of the screw body is increased since a barrier part that restricts a transport of the raw material that is provided in the screw body restricts a transport of a transport part that transports the raw material, and the raw material having the pressure being increased in the transport part is introduced to the passage from the inlet, while the kneaded product is continuously discharged, the raw material transported along the outer circumferential surface of the screw body flows in the passage of the extruder and then is guided to the transport part via an outlet provided on the outer circumferential surface of the screw body, and the raw material contains a conductive filler and a thermoplastic elastomer.

DESCRIPTION OF THE EMBODIMENTS

The disclosure provides a production method for a conductive composite material including a conductive filler and a thermoplastic elastomer by using a kneader that can continuously produce a kneaded product keeping consistent quality.

According to the disclosure, in the kneading process for kneading a raw material using the screw, a conductive composite material having high conductivity containing a conductive filler and a thermoplastic elastomer can be continuously manufactured by continuously transporting the processing object without stagnation.

Embodiments of the disclosure will be described with reference to a kneader used for the production method of the disclosure.

First Embodiment

A first embodiment will be described below with reference to FIG. 1 to FIG. 11.

Figure 1:
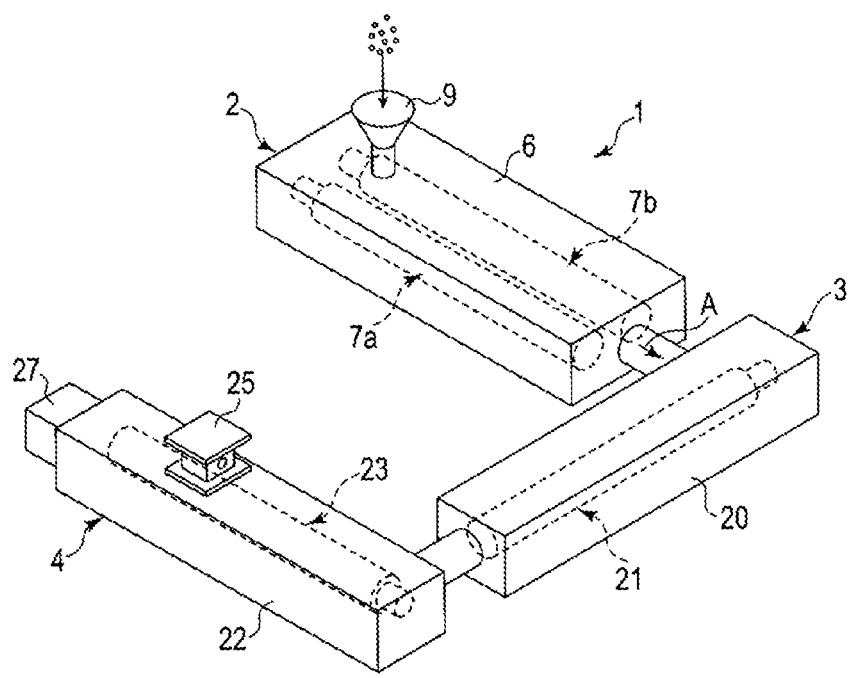
FIG. 1 is a perspective view schematically illustrating a continuous high shear processing apparatus (kneader) according to a first embodiment of the disclosure.

FIG. 1 schematically illustrates a configuration of a continuous high shear processing apparatus (kneader) 1 according to a first embodiment of the disclosure. The high shear processing apparatus 1 includes a first extruder (processing machine) 2, a second extruder 3, and a third extruder (deaerator) 4. The first extruder 2, the second extruder 3, and the third extruder 4 are connected in series.

The first extruder 2 is a processing machine for preliminarily kneading and melting, for example, two types of incompatible materials. Here, a conductive filler and a thermoplastic elastomer are applied as two types of materials. These materials are supplied to the first extruder 2 in a state of, for example, pellets, a powder, or the like.

Examples of the conductive filler used in the disclosure include carbon-based conductive fillers such as carbon black, graphite, and CNT. In addition, examples of the thermoplastic elastomer (thermoplastic elastomers or TPEs) include styrene-based TPEs such as styrene butadiene-based (SBS) and hydrogenated styrene butadiene-based (SEBS, SBBS) TPEs, urethane-based TPEs, and the like.

Figure 2:
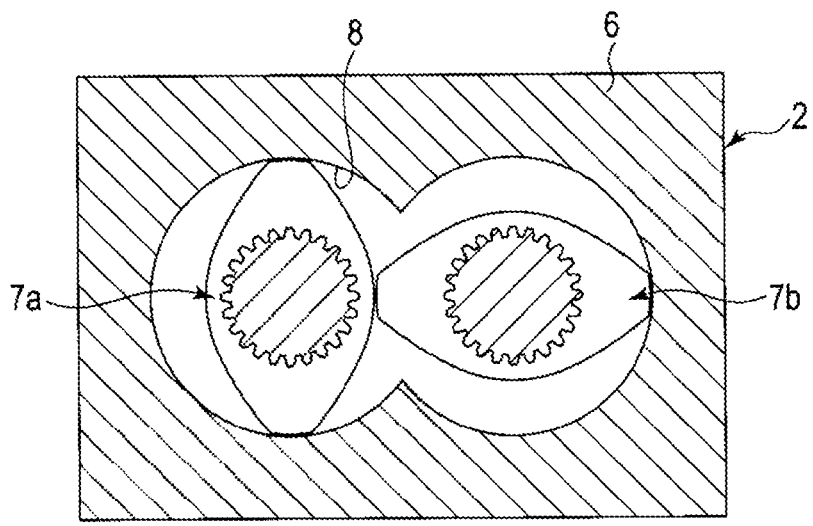
FIG. 2 is a cross-sectional view of a first extruder used in the first embodiment.
Figure 3:
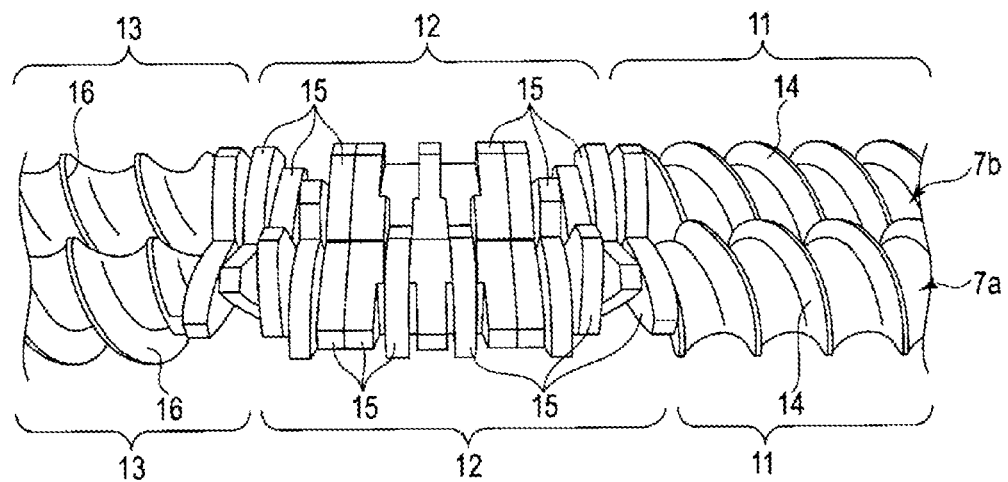
FIG. 3 is a perspective view illustrating a state in which two screws of the first extruder are engaged with each other in the first embodiment.

In the present embodiment, a same-direction rotating twin-screw kneader is used as the first extruder 2 for strengthening the degree of kneading and melting of the conductive filler (which will also be appropriately referred to as a "filler" below) and the thermoplastic elastomer (which will also be appropriately referred to as a "resin" below). FIG. 2 and FIG. 3 illustrate an example of a twin-screw kneader. The twin-screw kneader includes a barrel 6 and two screws 7a and 7b housed inside the barrel 6. The barrel 6 includes a cylinder part 8 in a form formed by combining two cylinders. The resin is continuously supplied to the cylinder part 8 from a supply port 9 provided at one end of the barrel 6. Furthermore, the barrel 6 includes a heater for melting the resin.

The screws 7a and 7b are housed in the cylinder part 8 in a state in which the screws are engaged with each other. The screws 7a and 7b receive a torque transmitted from a motor, which is not illustrated, and are rotated in the same direction. Each of the screws 7a and 7b includes a feeding part 11, a kneading part 12, and a pumping part 13 as illustrated in FIG. 3. The feeding part 11, the kneading part 12, and the pumping part 13 are arranged in a row in the axial direction of the screws 7a and 7b.

The feeding part 11 has spirally twisted flights 14. The flights 14 of the screws 7a and 7b rotate while they are engaged with each other and transport the material containing the filler and the resin supplied from the supply port 9 to the kneading part 12.

The kneading part 12 has a plurality of discs 15 arranged in the axial direction of the screws 7a and 7b. The discs 15 of the screws 7a and 7b rotate while facing each other and preliminarily knead the material containing the filler and the resin transported from the feeding part 11. The kneaded material is sent to the pumping part 13 due to the rotation of the screws 7a and 7b.

The pumping part 13 has spirally twisted flights 16. The flights 16 of the screws 7a and 7b rotate while being engaged with each other and extrude the preliminarily kneaded material out of the discharge end of the barrel 6.

By using the twin-screw kneader described above, the resin in the material supplied to the feeding part 11 of the screws 7a and 7b receives shear heating resulting from the rotation of the screws 7a and 7b and heat of the heater and then melts. The resin and the filler melted by the preliminary kneading in the twin-screw kneader compose blended raw materials. The raw materials are continuously supplied from the discharge end of the barrel 6 to the second extruder 3 as indicated by the arrow A in FIG. 1.

Furthermore, by configuring the first extruder 2 as a twin-screw kneader, not only can the resin be melted, but a shearing action can be applied to the resin and the filter. For this reason, the raw materials are melted due to the preliminary kneading in the first extruder 2 and maintains an optimum viscosity at the time point at which the raw materials are supplied to the second extruder 3. In addition, by configuring the first extruder 2 as a twin-screw kneader, a predetermined amount of the raw materials can be stably supplied per unit time when the raw materials are continuously supplied to the second extruder 3. Therefore, the burden of the second extruder 3 kneading the raw materials at a full scale can be reduced.

The second extruder 3 is a component for producing a kneaded product in which the filler component is highly dispersed in the resin component of the raw material. In the present embodiment, a single-screw extruder is used as the second extruder 3. The single-screw extruder includes a barrel 20 and a screw 21. The screw 21 has a function of repeatedly applying a shearing action and an extension action to a molten raw material. A configuration of the second extruder 3 including the screw 21 will be described below in detail.

Figure 4:
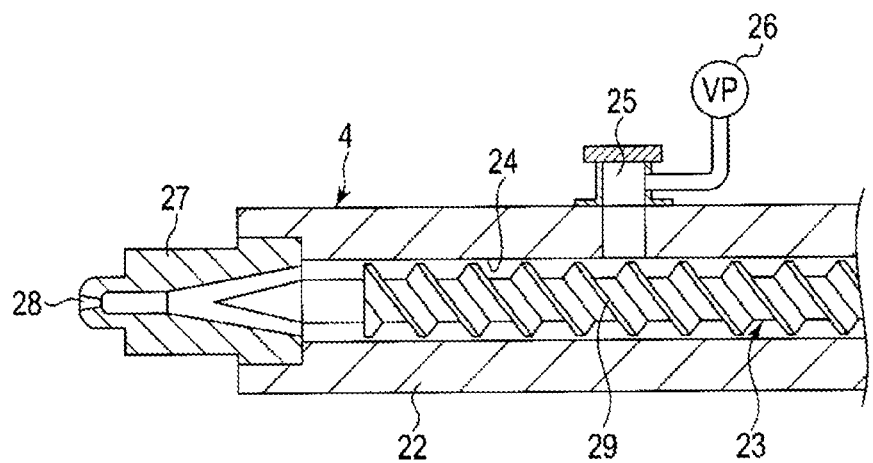
FIG. 4 is a cross-sectional view of a third extruder used in the first embodiment.

The third extruder 4 is a component for attracting and removing gas components included in the kneaded product discharged from the second extruder 3. In the preset embodiment, a single-screw extruder is used as the third extruder 4. The single-screw extruder includes a barrel 22 and a vent screw 23 housed in the barrel 22 as illustrated in FIG. 4. The barrel 22 includes a straight cylindrical cylinder part 24. The kneaded product extruded from the second extruder 3 is continuously supplied to the cylinder part 24 from one end of the cylinder part 24 in the axial direction.

The barrel 22 has a vent port 25. The vent port 25 opens at a middle part of the cylinder part 24 in the axial direction and connected to a vacuum pump 26. Furthermore, the other end of the cylinder part 24 of the barrel 22 is blocked by a head 27. The head 27 has a discharge port 28 from which the kneaded product is discharged.

The vent screw 23 is housed in the cylinder part 24. The vent screw 23 rotates in one direction by receiving torque transmitted from a motor, which is not illustrated. The vent screw 23 has a spirally twisted flight 29. The flight 29 is rotated integrally with the vent screw 23 and continuously transports the kneaded product supplied to the cylinder part 24 toward the head 27. When the kneaded product is transported to the position corresponding to the vent port 25, it receives the vacuum pressure of the vacuum pump 26. That is, by applying negative pressure to the inside of the cylinder part 24 using the vacuum pump, gaseous substances and other volatile components included in the kneaded product are continuously attracted and removed from the kneaded product. The kneaded product from which gaseous substances and other volatile components have been removed is continuously discharged from the discharge port 28 of the head 27 outside of the high shear processing apparatus 1 as a conductive composite material.

Next, the second extruder 3 will be described in detail.

Figure 5:
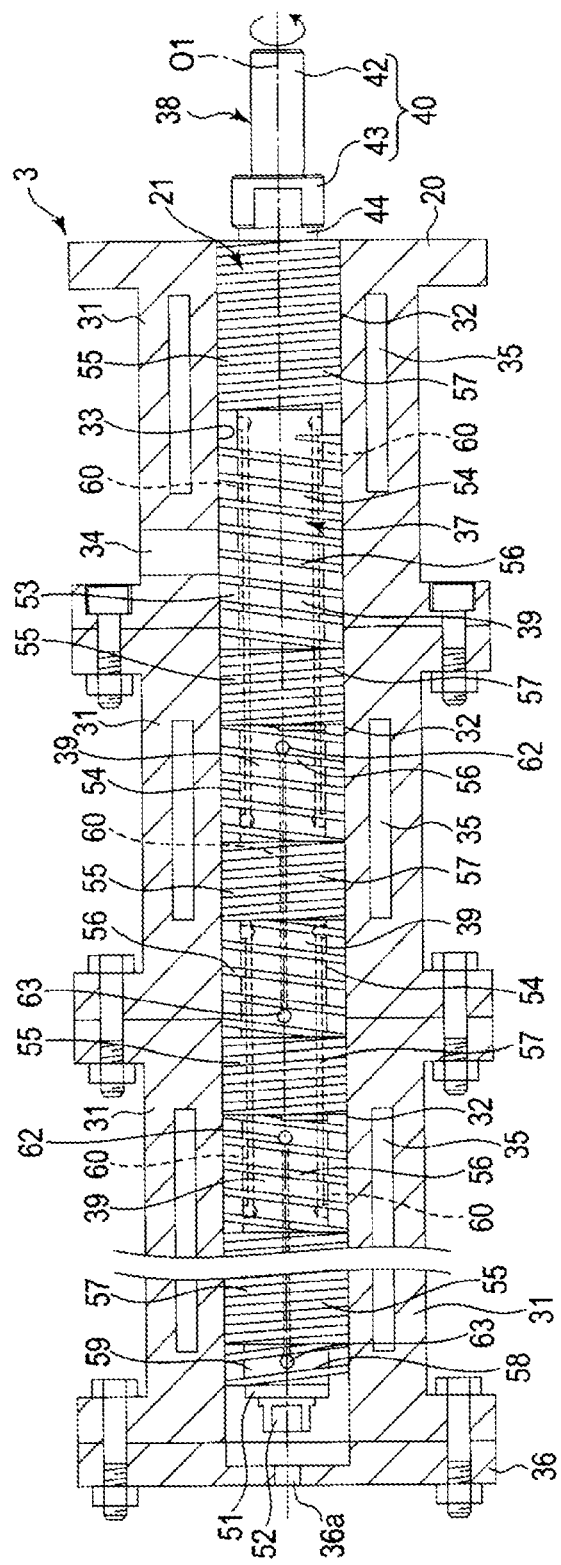
FIG. 5 is a cross-sectional view of a second extruder used in the first embodiment.
Figure 6:
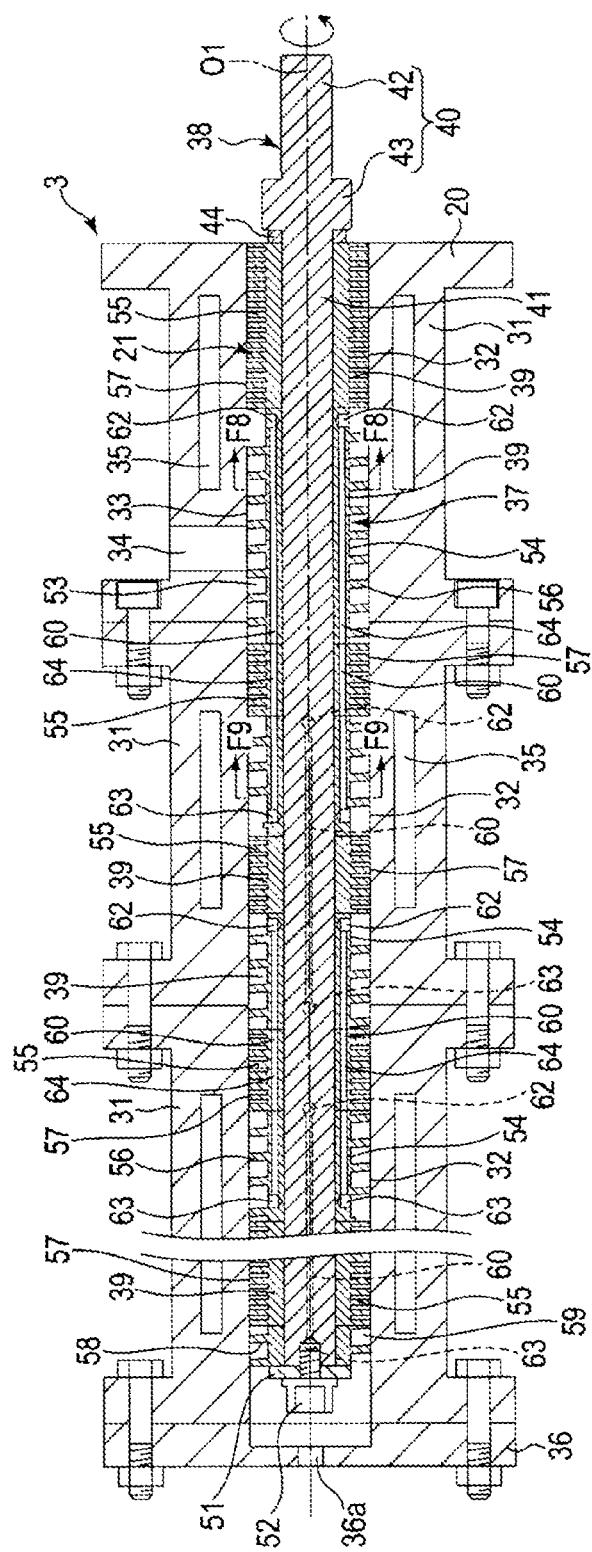
FIG. 6 is a cross-sectional view of the second extruder according to the first embodiment in which a barrel and a screw are illustrated together in the cross-section.

The barrel 20 of the second extruder 3 has a straight tubular shape and horizontally disposed as illustrated in FIG. 5 and FIG. 6. The barrel 20 is divided into a plurality of barrel elements 31.

Each of the barrel elements 31 has a cylindrical through hole 32. The barrel elements 31 are combined as one body by fastening them with bolts so that the through holes 32 are coaxially continuous. The through holes 32 of the barrel elements 31 define the cylindrical cylinder part 33 inside the barrel 20 in cooperation with each other. The cylinder part 33 extends in the axial direction of the barrel 20.

A supply port 34 is formed at one end of the barrel 20 in the axial direction. The supply port 34 communicates to the cylinder part 33 and the raw materials blended in the first extruder 2 is continuously supplied to the supply port 34.

The barrel 20 includes a heater, which is not illustrated. The heater adjusts a temperature of the barrel 20 so that the temperature of the barrel 20 reaches an optimum value for kneading the raw material. Furthermore, the barrel 20 includes refrigerant passages 35 along which a refrigerant, for example, water or oil, flows. The refrigerant passages 35 are disposed to surround the cylinder part 33. A refrigerant flows along the refrigerant passages 35 when the temperature of the barrel 20 reaches a predetermined upper limit to forcedly cool the barrel 20.

The other end of the barrel 20 in the axial direction is blocked by a head 36. The head 36 has a discharge port 36a. The discharge port 36a is positioned on the opposite side of the barrel 20 with respect to the supply port 34 in the axial direction and connected to the third extruder 4.

Figure 7:
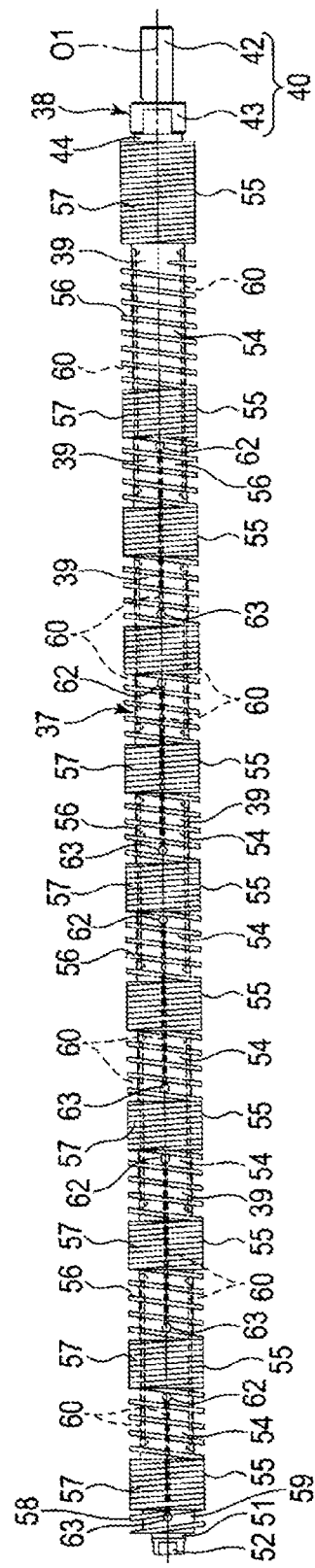
FIG. 7 is a side view of the screw used in the first embodiment.

The screw 21 includes a screw body 37 as illustrated in FIG. 5 to FIG. 7. The screw body 37 of the present embodiment is constituted by a rotating shaft 38 and a plurality of cylindrical tube bodies 39.

The rotating shaft 38 includes a first shaft part 40 and a second shaft part 41. The first shaft part 40 is positioned at the proximal end of the rotating shaft 38 that is one end side of the barrel 20. The first shaft part 40 includes a joint part 42 and a stopper part 43. The joint part 42 is linked to a drive source such as the motor via a coupling which is not illustrated. The stopper part 43 is coaxially provided with the joint part 42. The stopper part 43 has a larger diameter than the joint part 42.

The second shaft part 41 coaxially extends from an end surface of the stopper part 43 of the first shaft part 40. The second shaft part 41 has substantially the same length as the barrel 20 and has a tip facing the head 36. The straight axis O1 coaxially penetrating the first shaft part 40 and the second shaft part 41 extends horizontally in the axial direction of the rotating shaft 38.

Figure 8:
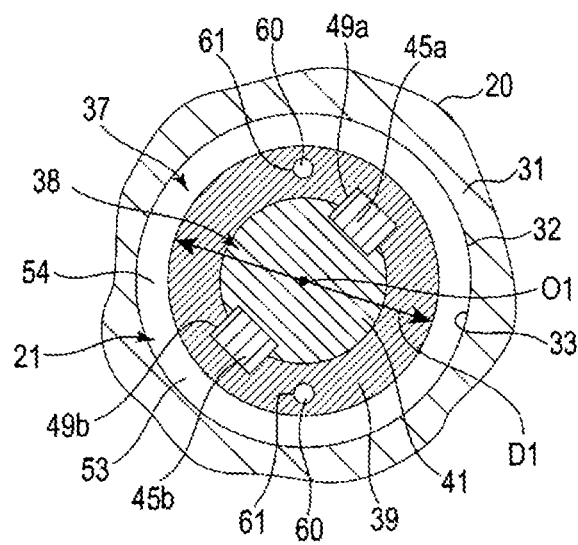
FIG. 8 is a cross-sectional view taken along the line F8-F8 of FIG. 6.
Figure 9:
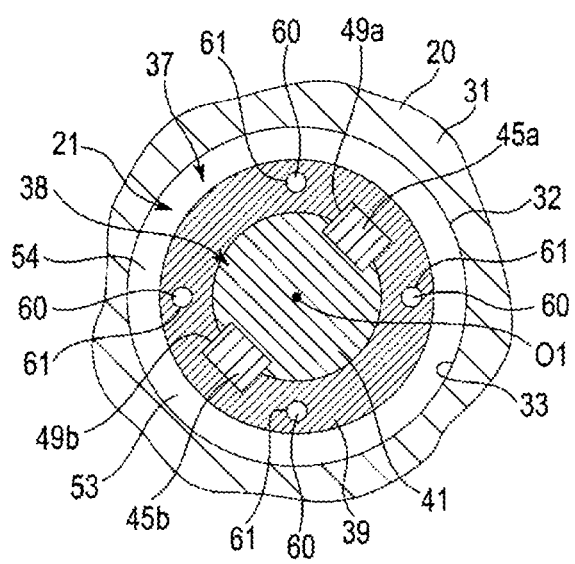
FIG. 9 is a cross-sectional view taken along the line F9-F9 of FIG. 6.

The second shaft part 41 has a solid columnar shape having a diameter smaller than that of the stopper part 43. A pair of keys 45a and 45b are attached to the outer circumferential surface of the second shaft part 41 as illustrated in FIG. 8 and FIG. 9. The keys 45a and 45b extend in the axial direction of the second shaft part 41 at positions on the second shaft part 41 shifted by 180° from each other in the circumferential direction.

Each of the tube bodies 39 is constituted that the second shaft part 41 is coaxially penetrating therethrough as illustrated in FIG. 6 to FIG. 9. A pair of key grooves 49a and 49b are formed on the inner circumferential surface of the tube bodies 39. The key grooves 49a and 49b extend in the axial direction of the tube bodies 39 at positions on the tube bodies 39 shifted by 180° in the circumferential direction.

The tube bodies 39 is inserted onto the second shaft part 41 from the direction of the tip of the second shaft part 41 in the state that the key grooves 49a and 49b aligned with the keys 45a and 45b of the second shaft part 41. In the present embodiment, a first collar 44 is interposed between the tube body 39 firstly inserted onto the second shaft part 41 and the end surface of the stopper part 43 of the first shaft part 40. Furthermore, after all the tube bodies 39 are inserted onto the second shaft part 41, a fixing screw 52 may be screwed into the tip surface of the second shaft part 41 via a second collar 51.

By screwing as described above, all the tube bodies 39 are fastened to each other between the first collar 44 and the second collar 51 in the axial direction of the second shaft part 41, and thus the end surfaces of neighboring tube bodies 39 are in close contact with each other without gaps therebetween.

At this time, since all the tube bodies 39 are coaxially combined on the second shaft part 41, each of the tube bodies 39 and the rotating shaft 38 are integrally assembled. Accordingly, each of the tube bodies 39 is rotated with respect to the axis O1 as a center together with the rotating shaft 38, that is, the screw body 37 can be rotated with respect to the axis O1 as the center.

In the above state, each of the tube bodies 39 is a constituent component defining the outer diameter D1 of the screw body 37 (see FIG. 8). That is, the tube bodies 39 coaxially combined with each other along the second shaft part 41 are set to have the same outer diameter D1. The outer diameter D1 of the screw body 37 (each tube body 39) is a diameter defined from the axis O1 that is the rotation center of the rotating shaft 38.

Accordingly, the segmented screw 21 of which the screw body 37 (each tube body 39) has a constant value for the outer diameter D1 is configured. The segmented screw 21 can maintain the plurality of screw elements in an arbitrary order and combination along the rotating shaft 38 (i.e., the second shaft part 41). As a screw element, for example, a tube body 39 on which at least some of flights 56, 57, and 58, which will be described below, are formed can be defined as one screw element.

By segmenting the screw 21 as described above, for example, convenience in modification or adjustment of specifications and repairing and maintenance of the screw 21 can be further improved.

Further, in the present embodiment, the cylindrical tube bodies 39 are not limited to being fixed to the rotating shaft 38 by the keys 45a and 45b. Instead of the keys 45a and 45b, for example, the tube bodies 39 may be fixed to the rotating shaft 38 using splines as illustrated in FIG. 2.

Furthermore, the segmented screw 21 is coaxially housed in the cylinder part 33 of the barrel 20. Specifically, the screw body 37 in which the plurality of screw elements are held along the rotating shaft 38 (the second shaft part 41) is rotatably housed in the cylinder part 33. In this state, the first shaft part 40 (the joint part 42 and the stopper part 43) of the rotating shaft 38 projects outward the barrel 20 from one end of the barrel 20.

Furthermore, in the above-described state, a transport path 53 for transporting the raw materials is formed between the outer circumferential surface of the screw body 37 in the circumferential direction and the inner circumferential surface of the cylinder part 33. The transport path 53 has a cross-section in the radial direction of the cylinder part 33 in an annular shape and extends along the cylinder part 33 in the axial direction.

In the present embodiment, when torque is received from the drive source, the screw 21 rotates left and counterclockwise when viewed from the proximal end of the screw 21 as indicated by the arrow in FIG. 5. The preferred rotational speed of the screw 21 for manufacturing a conductive composite material having high conductivity varies depending on the outer diameter of the screw 21. In general, the preferred rotational speed tends to increase as the outer diameter of the screw 21 becomes smaller. When the screw 21 having an outer diameter of 30 mm or greater and 50 mm or less is used, the rotational speed of the screw 21 is preferably 100 rpm to 1000 rpm, more preferably 200 rpm to 600 rpm, and even more preferably 300 rpm to 500 rpm.

The screw body 37 has a plurality of transport parts 54 and 59 for transporting the raw materials and a plurality of barrier parts 55 for limiting a fluidity of the raw materials as illustrated in FIG. 5 to FIG. 7. That is, the barrier parts 55 are disposed at the proximal end of the screw body 37 corresponding to the one end of the barrel 20, and the transport part 59 for discharge is disposed at the tip of the screw body 37 corresponding to the other end of the barrel 20. Furthermore, the transport parts 54 and the barrier parts 55 are disposed alternately between the barrier parts 55 and the transport part 59 in the axial direction from the proximal end to the tip of the screw body 37.

Further, the supply port 34 of the barrel 20 is open toward the transport part 54 disposed on the proximal end side of the screw body 37.

Each of the transport parts 54 has a spirally twisted flight 56. The flight 56 protrudes from the outer circumferential surface of the tube bodies 39 in the circumferential direction toward the transport path 53. The flight 56 is twisted from the tip to the proximal end of the screw body 37 to transport the raw materials when the screw 21 rotates left. That is, the flight 56 is twisted to the left such that the twisting direction of the flight 56 is the same as that of a left-hand screw.

Furthermore, the transport part 59 for discharge has a spirally twisted flight 58. The flight 58 protrudes from the outer circumferential surface of the tube bodies 39 in the circumferential direction toward the transport path 53. The flight 58 is twisted to transport the raw materials from the proximal end to the tip of the screw body 37 when the screw 21 rotates to the left. That is, the flight 58 is twisted to the right such that the twisting direction of the flight 58 is the same as that of a right-hand screw.

Each of the barrier parts 55 has a spirally twisted flight 57. The flight 57 protrudes from the outer circumferential surface of the tube bodies 39 in the circumferential direction toward the transport path 53. The flight 57 is twisted to transport the raw materials from the proximal end to the tip of the screw body 37 when the screw 21 rotates left. That is, the flight 57 is twisted to the right such that the twisting direction of the flight 57 is the same as that of a right-hand screw.

A twist pitch of the flight 57 of each barrier part 55 is set to be the same as or smaller than twist pitches of the flights 56 and 58 of the transport parts 54 and 59. Furthermore, a slight clearance is secured between the apexes of the flights 56, 57, and 58 and the inner circumferential surface of the cylinder part 33 of the barrel 20.

In this case, a clearance between the outer diameter parts of the barrier parts 55 (the apex of the flight 57) and the inner circumferential surface of the cylinder part 33 is preferably set in the range of 0.1 mm to 2 mm. The clearance is more preferably set in the range of 0.1 mm to 0.7 mm. Accordingly, raw materials transported through the clearance can be reliably restricted.

Further, the axial direction of the screw body 37 can be reworded to the longitudinal direction of the screw body 37, in other words, the longitudinal direction of the screw 21. Here, lengths of the transport parts 54 and 59 in the axial direction of the screw body 37 are appropriately set according to, for example, the type of raw materials, the degree of kneading of the raw materials, the production amount of kneaded product per unit time, and the like. The transport parts 54 and 59 refer to at least regions of the outer circumferential surface of the tube bodies 39 in which the flights 56 and 58 are formed, and are not limited to regions between the start points and end points of the flights 56 and 58.

That is, the region on the outer circumferential surface of the tube bodies 39 besides the flights 56 and 58 may be regarded as the transport parts 54 and 59. For example, when cylindrical spacers or cylindrical collars are disposed at the positions at which the tube bodies 39 having the flights 56 and 58 are neighboring, the spacers and the collars can also be included in the transport parts 54 and 59.

Furthermore, a length of the barrier parts 55 in the axial direction of the screw body 37 is appropriately set according to, for example, the type and degree of kneading the raw materials, the production amount of kneaded product per unit time, and the like. The barrier parts 55 functions to hold back the fluidity of the raw materials transported by the transport parts 54. That is, the barrier parts 55 are neighboring to the transport parts 54 on the downstream side in the transport direction of the raw materials and prevent the raw materials transported by the transport parts 54 from passing through the clearance between the apex of the flight 57 and the inner circumferential surface of the cylinder part 33.

Furthermore, each of the flights 56, 57, and 58 of the screw 21 described above protrudes from the outer circumferential surfaces of the plurality of tube bodies 39 each of which has the same outer diameter D1 to the transport path 53. Thus, the outer circumferential surface of each tube body 39 in the circumferential direction defines the root diameter of the screw 21. The root diameter of the screw 21 has a constant value over the entire length of the screw 21.

The screw body 37 has a plurality of passages 60 extending in the axial direction inside the screw body 37 as illustrated in FIG. 5 to FIG. 7 and FIG. 10. Each passage 60 is formed such that it has one barrier part 55 and two transport parts 54 sandwiching the aforementioned barrier part 55 as one unit, the passage crossing the barrier part 55 of each unit in the tube body 39 of the transport part 54 of the unit set.

In this case, the passages 60 are arranged at predetermined intervals (e.g., equal intervals) in the axial direction of the screw body 37. In addition, four passages 60 extending in the axial direction of the screw body 37 are arranged in the circumferential direction of the screw body 37 at the middle part of the screw body 37 in the axial direction at 90° intervals.

Furthermore, the passages 60 are provided at positions eccentric with respect to the axis O1 of the rotating shaft 38 in the tube bodies 39. In other words, the passages 60 are away from the axis O1 and revolve around the axis O1 when the screw body 37 rotates.

The passages 60 are holes having, for example, a circular cross-sectional shape as illustrated in FIG. 8 and FIG. 9. From the viewpoint of smooth flow of the raw materials including a filler and a resin, an inner diameter of the holes is set to, for example, 2 mm or greater and smaller than 8 mm, and preferably 3 mm or greater and smaller than 5 mm. Furthermore, the tube bodies 39 of the transport parts 54 and the barrier parts 55 have tubular wall surfaces 61 defining the holes. That is, the passages 60 are holes formed only of hollow spaces, and the wall surfaces 61 continuously surround the hollow passages 60 in the circumferential direction. Accordingly, the passages 60 serve as hollow spaces only allowing the raw materials to flow. In other words, there are no other components constituting the screw body 37 inside the passages 60. Furthermore, the wall surfaces 61 revolve around the axis O1 without rotating around the axis O1 when the screw body 37 rotates.

Figure 11:
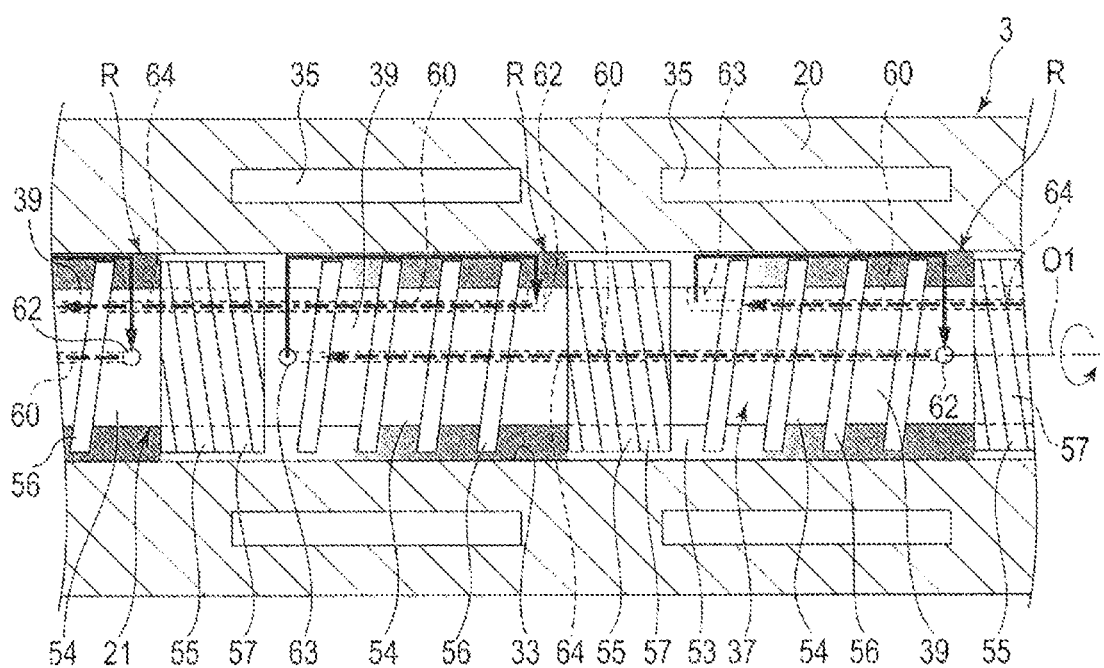
FIG. 11 is a cross-sectional view of the second extruder schematically illustrating the flow direction of the raw materials when the screw rotates in the first embodiment.

Each of the passages 60 has an inlet 62, an outlet 63, and a passage body 64 allowing the inlet 62 to communicate with the outlet 63 as illustrated in FIG. 5, FIG. 6, and FIG. 11. The inlet 62 and the outlet 63 are provided away from the two sides of one barrier part 55.

Specifically, in the transport part 54 adjacent to the barrier part 55 on the proximal end side of the screw body 37, the inlet 62 is open on the outer circumferential surface near the downstream end of the transport part 54. In addition, in the transport part 54 adjacent to the barrier part 55 on the tip side of the screw body 37, the outlet 63 is open on the outer circumferential surface near the upstream end of the transport part 54.

The passage body 64 extends linearly in the axial direction of the screw body 37 without branching on the way. As an example, the passage body 64 is illustrated as extending parallel to the axis O1 in the drawings. Both sides of the passage body 64 are axially blocked.

The inlet 62 is provided on one side of the passage body 64, that is, a part on the proximal end side of the screw body 37. In this case, the inlet 62 may open on the outer circumferential surface of the screw body 37 from the end surface of the one side of the passage body 64, or on the outer circumferential surface of the screw body 37 from a part on the one end surface side of the passage body 64, that is, a part in front of the end surface. Further, an opening direction of the inlet 62 is not limited to a direction orthogonal to the axis O1, and may be a direction intersecting the axis O1. In this case, openings may be set in a plurality of directions from one side of the passage body 64, and accordingly a plurality of inlets 62 may be provided.

In another way of understanding, the inlet 62 is open on the outer circumferential surface of the transport part 54 apart from the barrier part 55 in the direction of the proximal end of the screw body 37 for each unit mentioned above. The inlet 62 is desirably provided at the most distant position in the direction of the proximal end of the screw body 37 on the outer circumferential surface of the tube body 39 forming the transport part 54. Accordingly, the inlet 62 is positioned immediately before the barrier part 55 neighboring to the transport part 54 in which the inlet 62 is open in the direction of the proximal end of the screw body 37.

The outlet 63 is provided on the opposite side (the opposite side to the one side) of the passage body 64, that is, at a part on the tip side of the screw body 37. In this case, the outlet 63 may open on the outer circumferential surface of the screw body 37 from the end surface of the other side of the passage body 64, or on the outer circumferential surface of the screw body 37 from a part on the other end surface side of the passage body 64, that is, a part in front of the end surface. Further, an opening direction of the outlet 63 is not limited to a direction orthogonal to the axis O1, and may be a direction intersecting the axis O1. In this case, openings may be set in a plurality of directions from the other side of the passage body 64, and accordingly a plurality of outlets 63 may be provided.

In another way of understanding, the outlet 63 is open on the outer circumferential surface of the transport part 54 apart from the barrier part 55 in the direction of the tip of the screw body 37 for each unit mentioned above. The outlet 63 is desirably provided at the most distant position in the direction of the tip of the screw body 37 on the outer circumferential surface of the tube body 39 forming the transport part 54. Accordingly, the outlet 63 is positioned immediately before the barrier part 55 neighboring to the transport part 54 in which the outlet 63 is open in the direction of the tip of the screw body 37.

The passage body 64 connecting the inlet 62 and the outlet 63 crosses the barrier part 55 for each of the units mentioned above and has a length across the two transport parts 54 sandwiching the barrier part 55. In this case, a diameter of the passage body 64 may be set to be smaller than or the same as the diameter of the inlet 62 and the outlet 63. In any case, a passage cross-sectional area defined by the diameter of the passage body 64 is set to be much smaller than the annular cross-sectional area of the above-described annular transport path 53 in the radial direction.

According to the continuous high shear processing apparatus 1 configured as described above, the first extruder 2 preliminarily kneads the filler and the resin. The filler and the resin melted by the kneading serve as raw materials having fluidity and are continuously supplied from the first extruder 2 to the transport path 53 via the supply port 34 of the second extruder 3.

Figure 10:
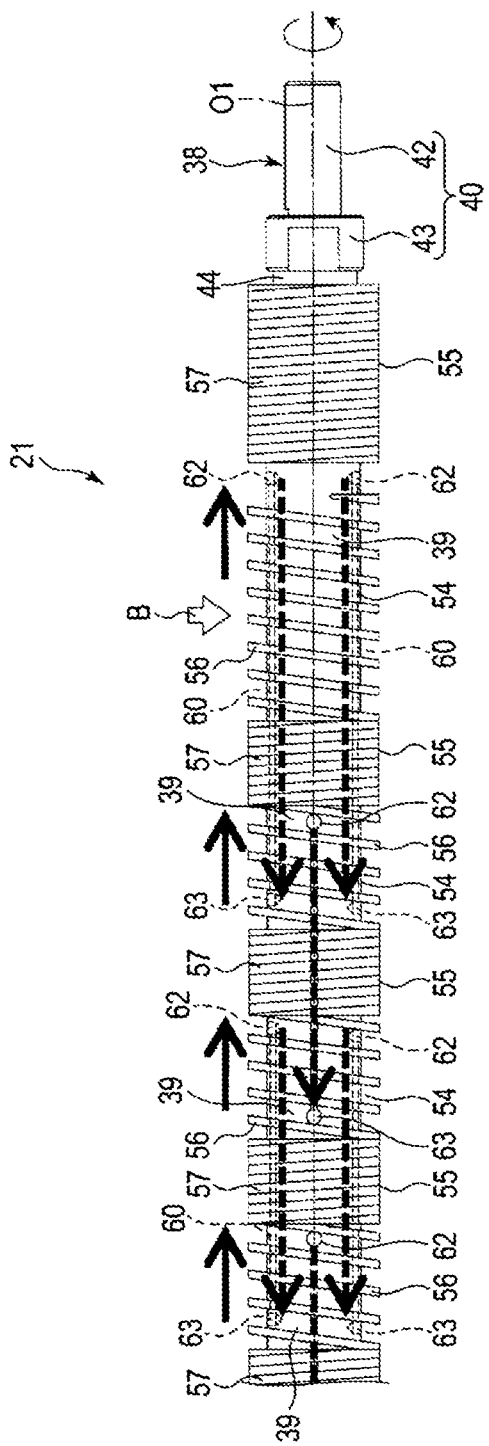
FIG. 10 is a side view illustrating the flow direction of raw materials with respect to the screw in the first embodiment.

The raw materials supplied to the second extruder 3 is input to the outer circumferential surface of the transport part 54 positioned on the proximal end side of the screw body 37 as indicated by the arrow B of FIG. 10. At this time, when the screw 21 rotates left and counterclockwise from the proximal end of the screw body 37, the flight 56 of the transport part 54 continuously transports the raw materials toward the barrier part 55 neighboring to the proximal end of the screw body 37 as indicated by the solid arrows of FIG. 10.

At this time, a shearing action caused by the difference in speeds of the flight 56 swirling along the transport path 53 and the inner circumferential surface of the cylinder part 33 is applied to the raw materials, and the raw materials are stirred by the slightly twisting flight 56. As a result, the raw materials are kneaded in full scale and dispersion of the filler in the resin that is a polymer component of the raw materials advances.

The raw materials that have received the shearing action reach the boundaries between the transport parts 54 and the barrier parts 55 along the transport path 53. The flights 57 of the barrier parts 55 are twisted in the right direction so that the raw materials are transported from the proximal end to the tip of the screw body 37 when the screw 21 rotates left. As a result, the transport of the raw materials is blocked by the flights 57. In other words, the flights 57 of the barrier parts 55 prevent the raw materials transported by the flight 56 from going through the clearance between the barrier parts 55 and the inner circumferential surface of the cylinder part 33 by restricting the fluidity of the raw materials when the screw 21 rotates left.

At this time, pressure of the raw materials on the boundaries between the transport parts 54 and the barrier parts 55 increases. For specific description, FIG. 11 illustrates a filling proportion of the raw materials at the locations on the transport path 53 corresponding to the transport part 54 of the screw body 37 expressed in gradation. That is, the filling proportion of the raw materials increases as the color tone becomes darker on the transport path 53. As is apparent from FIG. 11, the filling proportion of the raw materials increases on the transport path 53 corresponding to the transport part 54 going closer to the barrier part 55 and reaches 100% immediately before the barrier parts 55.

Thus, a "raw material reservoir R" in which the filling proportion of the raw materials is 100% is formed immediately before each barrier part 55. In the raw material reservoir R, pressure of the raw materials increases since fluidity of the raw materials is blocked. The raw materials with the increased pressure continuously flow from the inlet 62 that is open on the outer circumferential surface of the transport part 54 to the passage body 64 as indicated by the dashed arrows in FIG. 10 and FIG. 11 and thus continuously flows in the passage body 64 from the proximal end to the tip of the screw body 37.

The passage cross-sectional area defined by the diameter of the passage body 64 is much smaller than the annular cross-sectional area of the transport path 53 in the radial direction of the cylinder part 33 as described above. In another way of understanding, the spread area based on the diameter of the passage body 64 is much smaller than the spread area of the annular transport path 53. For this reason, since the raw materials are sharply squeezed when they are input from the inlet 62 to the passage body 64, an extension action is applied to the raw material.

Furthermore, since the passage cross-sectional area is sufficiently smaller than the annular cross-sectional area, the raw materials collected in the raw material reservoir R would not disappear. That is, some of the raw materials collected in the raw material reservoir R continuously flows into the inlet 62. For the time being, a new raw material is transported by the flight 56 to the barrier part 55. As a result, the filling proportion in the raw material reservoir R immediately before the barrier part 55 is maintained at 100% at all times. At this time, even if a little variation occurs in the amount of the raw materials transported by the flight 56, the variation state is absorbed by the raw materials remaining in the raw material reservoir R. Accordingly, the raw materials can be continuously and stably supplied to the passage 60. Thus, the extension action can be continuously applied to the raw materials in the passage 60 without interruption.

The raw materials that have passed through the passage body 64 flows out from the outlet 63 as indicated by the solid arrows in FIG. 11. Accordingly, the raw materials are continuously guided on another transport part 54 neighboring to the barrier parts 55 in the direction of the tip of the screw body 37. The guided raw materials are continuously transported by the flight 56 of the transport part 54 in the direction of the proximal end of the screw body 37 and receives the shearing action again in the course of the transport. The raw materials that have received the shearing action continuously flow from the inlet 62 to the passage body 64 and receive the extension action again in the course of flow in the passage body 64.

In the present embodiment, the plurality of transport parts 54 and the plurality of barrier parts 55 are alternately arranged in the axial direction of the screw body 37, and the plurality of passages 60 are arranged having intervals therebetween in the axial direction of the screw body 37. For this reason, the raw materials input from the supply port 34 into the screw body 37 are continuously transported in the direction from the proximal end to the tip of the screw body 37 while repeatedly receiving the shearing action and the extension action in an alternating manner as indicated by the arrows in FIG. 10 and FIG. 11. Thus, the degree of kneading the raw material is strengthened and dispersion of the filler in the resin of the material is promoted.

The raw materials that have reached the tip of the screw body 37 turn into a kneaded product that has been sufficiently kneaded and flow out from the outlet 63 of the passages 60. The kneaded product that has flowed out is continuously transported to the gap between the cylinder part 33 and the head 36 by the flight 58 of the transport part 59 for discharge and then continuously supplied from the discharge port 36a to the third extruder 4.

In the third extruder 4, the gaseous substances and other volatile components included in the kneaded product are continuously removed from the kneaded product as described above. The kneaded product from which the gaseous substances and other volatile components have been removed is continuously discharged from the discharge port 28 of the head 27 to the outside of the high shear processing apparatus 1. The discharged kneaded product is immersed into cooling water stored in a water tank. Accordingly, the kneaded product is forcedly cooled and a desired resin molded product formed of the conductive composite material is obtained.

According to the first embodiment described above, the raw materials supplied from the first extruder 2 are transported while being repeatedly reversed a plurality of times in the axial direction of the screw body 37 in the second extruder 3 and the shearing action and the extension action are repeatedly applied to the raw materials in the course of the transport. In other words, since the raw materials would not circulate at the same location on the outer circumferential surface of the screw body 37 many times, the raw materials can be supplied from the second extruder 3 to the third extruder 4 without interruption.

Accordingly, the kneaded product that has been sufficiently kneaded can be continuously molded and efficiency in producing kneaded products can be dramatically increased in comparison to batch extruders.

In addition, in the present embodiment, the resin that has been preliminarily kneaded in the first extruder 2 is continuously supplied to the second extruder 3 without interruption. Thus, the flow of the resin would not temporarily stagnate in the first extruder 2. Accordingly, a change in temperature, viscosity, or phase of the resin caused by the kneaded resin stagnating in the first extruder 2 can be prevented. As a result, the raw materials keeping consistent quality at all times can be supplied from the first extruder 2 to the second extruder 3.

Furthermore, according to the first embodiment, completely continuous production of kneaded products, not seemingly continuous production, is possible. That is, the shearing action and the extension action can be alternately applied to the raw materials in the second extruder 3 while the raw materials are continuously transported from the first extruder 2 to the second extruder 3 and the third extruder 4 without interruption. According to this configuration, the molten raw materials are stably supplied from the first extruder 2 to the second extruder 3.

Furthermore, according to the first embodiment, an operation condition of each of the first extruder 2 and the second extruder 3 can be set to be optimum while operation conditions thereof are associated with each other in completely continuous production. For example, when a resin is to be preliminarily kneaded in the first extruder 2, the screw can be operated at 300 rpm from 100 rpm of the related art. Thus, sufficient heating, melting, and preliminary kneading for the resin are possible. On the other hand, the second extruder 3 can be operated by rotating the screw 21 at 1000 rpm from 100 rpm. For this reason, the shearing action and the extension action can be effectively applied to the filler and the resin in an alternating manner.

Accordingly, the first extruder 2 and the second extruder 3 may include screws according to their roles or functions. That is, the first extruder 2 may include the screws 7a and 7b according to the role or function of preliminarily kneading the supplied material. On the other hand, the second extruder 3 may include the screw 21 according to the role or function of applying the shearing action and the extension action to the molten raw materials supplied from the first extruder 2. Accordingly, it is possible to prevent the first extruder 2 and the second extruder 3 from being lengthened.

In addition, since the screw 21 is designed such that the transport parts 54, the barrier parts 55, and the passages 60 are disposed to be combined, without a plasticizing zone which is provided in a screw of a single-screw extruder of the related art, the second extruder 3 can be easily operated.

In addition, since the root diameter of the screw 21 is set to a constant value over the entire length of the screw 21, the transport path 53 for transporting the raw materials can have a uniform annular cross-sectional shape over the entire length of the screw 21, the shearing action and the extension action can be smoothly applied to the raw materials in order in an alternating manner, and thus uniform kneading can be performed.

According to the first embodiment, since the passages 60 in which the extension action is applied to the raw materials extend in the axial direction of the screw body 37 at the position eccentric with respect to the axis O1 which serves as the rotation center of the screw body 37, the passages 60 revolve around the axis O1. In other words, the tubular wall surfaces 61 defining the passages 60 revolve around the axis O1, without rotating having the axis O1 at the center.

Thus, when the raw materials pass through the passages 60, even though the raw materials receive a centrifugal force, they are not vigorously stirred inside the passages 60. Thus, the raw materials that are passing through the passages 60 are not likely to receive the shearing action, and the extension action is mostly applied to the raw materials that have passed through the passages 60 and return to the outer circumferential surface of the transport part 54.

Therefore, according to the screw 21 of the first embodiment, it is possible to clearly define to which location of the raw materials the shearing action is to be applied and the extension action is to be applied. From this, a configuration that is advantageous in determining the degree of kneading the raw materials can be achieved and the degree of kneading can be accurately controlled. As a result, a kneaded product with a microscopic dispersion structure in which the filler is highly dispersed in the resin of the raw materials can be produced.

In addition, since all the plurality of passages 60 are eccentric with respect to the axis O1, the extension action can be equally applied to the raw materials passing through the plurality of passages 60. That is, variations in the kneading conditions of the plurality of passages 60 can be eliminated, and uniform kneading can be performed.

Second Embodiment

Figure 12:
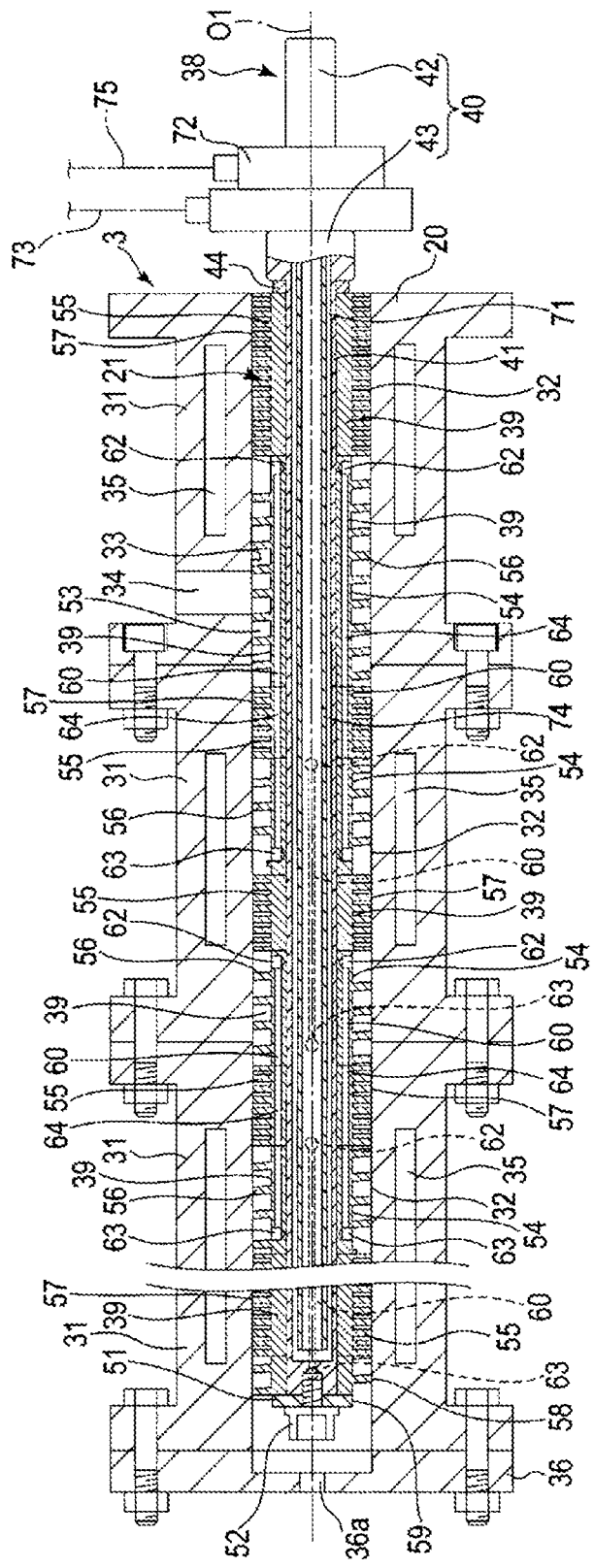
FIG. 12 is a cross-sectional view of a second extruder used in a second embodiment of the disclosure.

FIG. 12 illustrates a second embodiment. The second embodiment has the difference relating to the rotating shaft 38 from the first embodiment. Other configurations of the screw 21 are basically similar to those of the first embodiment. Thus, by giving the same reference symbols to the same constituent components of the second embodiment as those of the first embodiment, description thereof will be omitted.

A refrigerant passage 71 is formed inside the rotating shaft 38 as illustrated in FIG. 12. The refrigerant passage 71 coaxially extends along the axis O1 of the rotating shaft 38. One end of the refrigerant passage 71 is connected with outlet piping 73 via a rotary joint 72 at a position of the joint part 42. The other end of the refrigerant passage 71 is blocked at the tip of the rotating shaft 38 to be liquid tight.

A refrigerant introduction pipe 74 is coaxially inserted into the refrigerant passage 71. One end of the refrigerant introduction pipe 74 is connected with inlet piping 75 via the rotary joint 72. The other end of the refrigerant introduction pipe 74 is open near the other end of the refrigerant passage 71 in the refrigerant passage 71.

In the second embodiment, a refrigerant such as water or oil is sent from the inlet piping 75 to the refrigerant passage 71 via the rotary joint 72 and the refrigerant introduction pipe 74. The refrigerant sent to the refrigerant passage 71 passes the gap between the inner circumferential surface of the refrigerant passage 71 and the outer circumferential surface of the refrigerant introduction pipe 74, returns to the joint part 42 of the rotating shaft 38, and comes back to the outlet piping 73 via the rotary joint 72.

According to the second embodiment, since the refrigerant circulates in the axial direction of the rotating shaft 38, the screw body 37 can be cooled using the refrigerant. For this reason, the temperature of the screw body 37 that is contact with the raw materials can be appropriately adjusted, and degradation, a change in viscosity, and the like of the resin attributable to a rise in the temperature of the raw materials can be prevented in advance.

Third Embodiment

FIG. 13 to FIG. 18 illustrates a third embodiment. The third embodiment has the different relating to the screw body 37 from the first embodiment. Other configurations of the screw 21 are basically similar to those of the first embodiment. Thus, by giving the same reference symbols to the same constituent components of the third embodiment as those of the first embodiment, description thereof will be omitted.

As illustrated in FIG. 13 to FIG. 16, the screw body 37 has a plurality of transport parts 81 for transporting the raw materials and a plurality of barrier parts 82 for restricting fluidity of the raw material. That is, the plurality of transport parts 81 are disposed at the proximal end of the screw body 37 corresponding to one end of the barrel 20, and the plurality of transport parts 81 are disposed at the tip of the screw body 37 corresponding to the other end of the barrel 20. Furthermore, the transport parts 81 and the barrier parts 82 are alternately disposed side by side in the axial direction from the proximal end to the tip of the screw body 37 between the transport parts 81.

Further, the supply port 34 of the barrel 20 is open toward the transport parts 81 disposed on the proximal end side of the screw body 37.

Each transport part 81 has a spirally twisted flight 84. The flight 84 protrudes from the outer circumferential surface of the tube body 39 in the circumferential direction toward the transport path 53. The flight 84 is twisted such that the raw materials are transported from the proximal end to the tip of the screw body 37 when the screw 21 rotates to the left and counterclockwise when viewed from the proximal end of the screw body 37. That is, the flight 84 is twisted to the right such that the twisting direction of the flight 84 is set to the same as a right-hand screw.

Each barrier part 82 has a spirally twisted flight 86. The flight 86 protrudes from the outer circumferential surface of the tube body 39 in the circumferential direction toward the transport path 53. The flight 86 is twisted such that the raw materials are transported from the tip to the proximal end of the screw body 37 when the screw 21 rotates to the left and counterclockwise when viewed from the proximal end of the screw body 37. That is, the flight 86 is twisted to the left such that the twisting direction of the flight 86 is set to the same as a left-hand screw.

A twist pitch of the flight 86 of each barrier part 82 is set to be the same as or smaller than twist pitch of the flight 84 of the transport part 81. Furthermore, a slight clearance is secured between the apexes of the flights 84, and 86 and the inner circumferential surface of the cylinder part 33 of the barrel 20.

Figure 13:
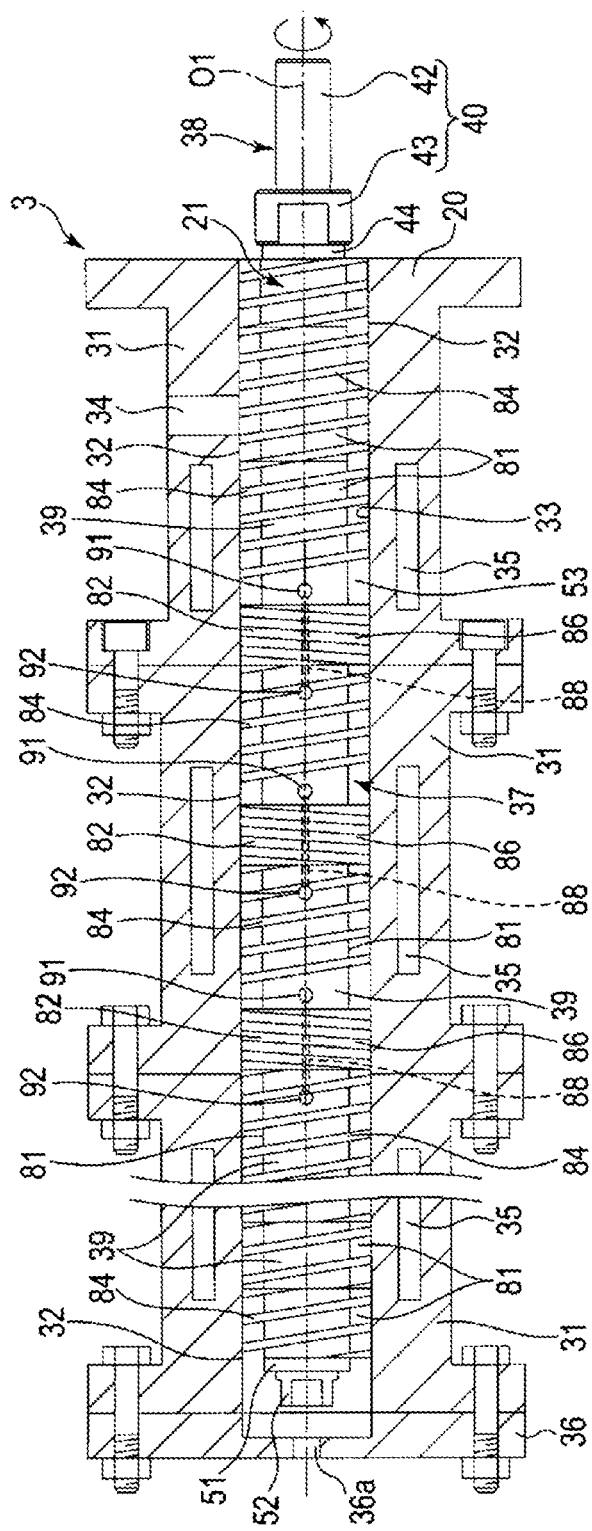
FIG. 13 is a cross-sectional view of a second extruder used in a third embodiment of the disclosure.
Figure 14:
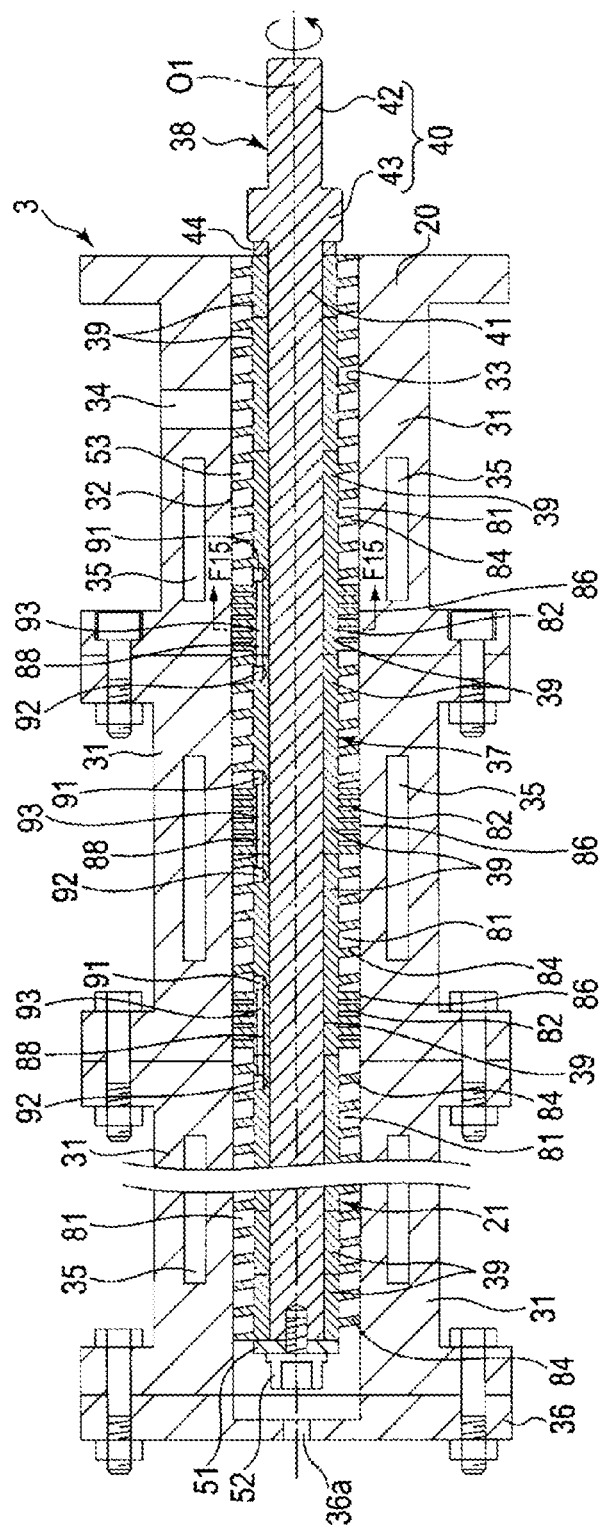
FIG. 14 is a cross-sectional view of the second extruder according to the third embodiment in which a barrel and a screw are illustrated together in the cross-section.
Figure 17:
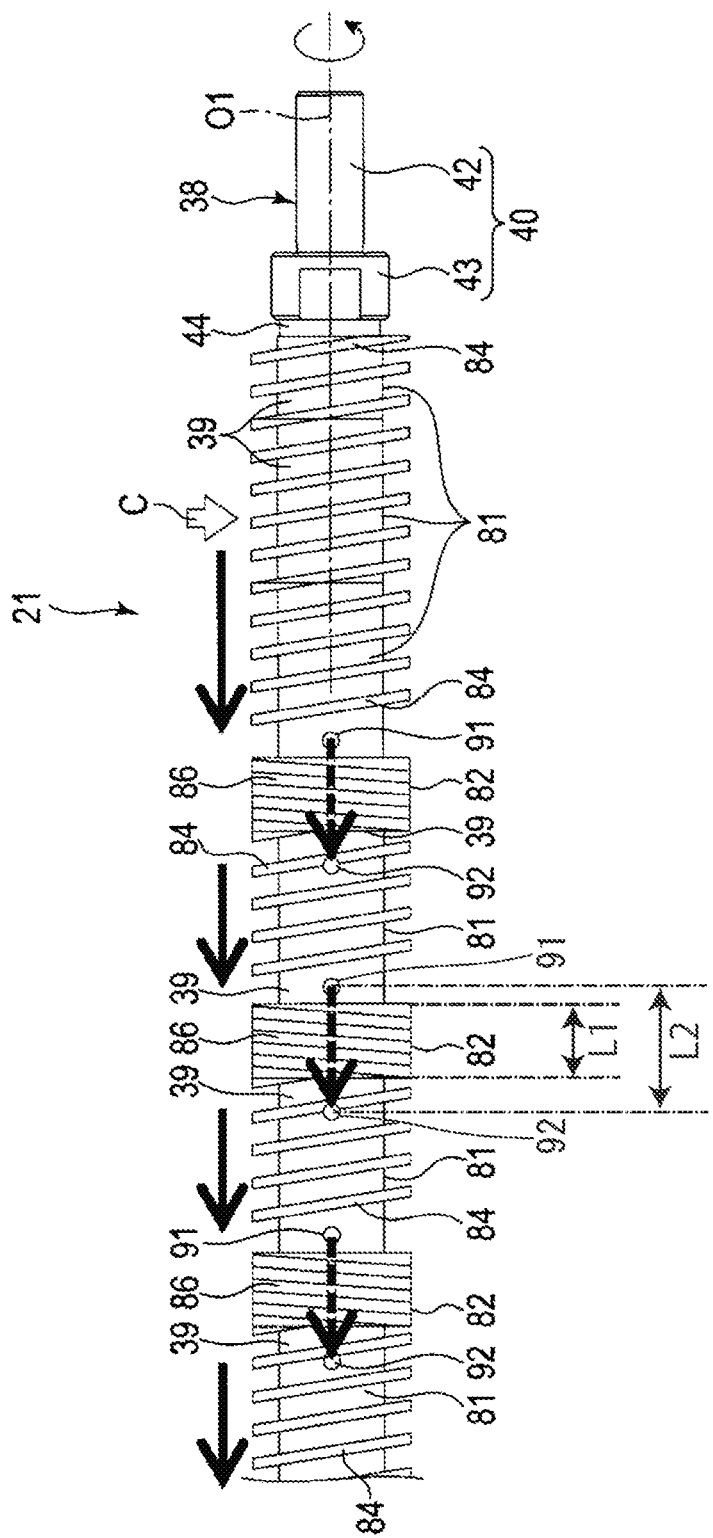
FIG. 17 is a side view illustrating the flow direction of raw materials with respect to the screw in the third embodiment.

The screw body 37 has a plurality of passages 88 extending in the axial direction of the screw body 37 as illustrated in FIG. 13, FIG. 14, and FIG. 17. Each passage 88 is formed such that, having one barrier part 82 and two transport parts 81 sandwiching the aforementioned barrier part 82 as one unit, the passage crosses the barrier part 82 of each unit in the tube body 39 of the two transport parts 81 of the unit set. In this case, the passages 88 are aligned in a row at predetermined intervals (e.g., equal intervals) on the same straight line in the axial direction of the screw body 37.

Furthermore, the passages 88 are provided at positions eccentric with respect to the axis O1 of the rotating shaft 38 inside the tube bodies 39. In other words, the passages 88 are away from the axis O1 and revolve around the axis O1 when the screw body 37 rotates.

Figure 15:
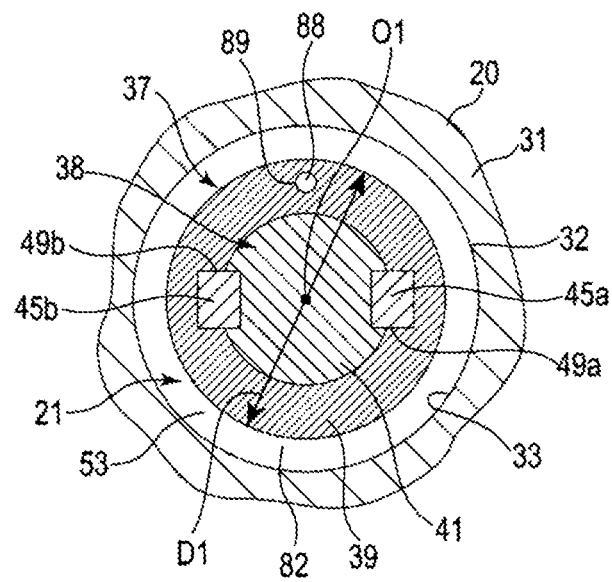
FIG. 15 is a cross-sectional view taken along the line F15-F15 of FIG. 14.
Figure 16:
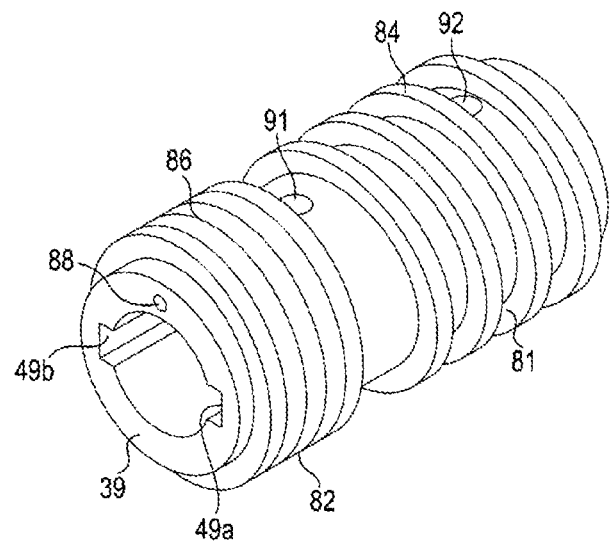
FIG. 16 is a perspective view of a cylindrical body used in the third embodiment.

The passage 88 has, for example, a hole having a circular cross-sectional shape as illustrated in FIG. 15. The passage 88 serves as a hollow space only allowing the raw materials to flow. A wall surface 89 of the passage 88 revolves around the axis O1 without rotating around the axis O1 when the screw body 37 rotates.

Figure 18:
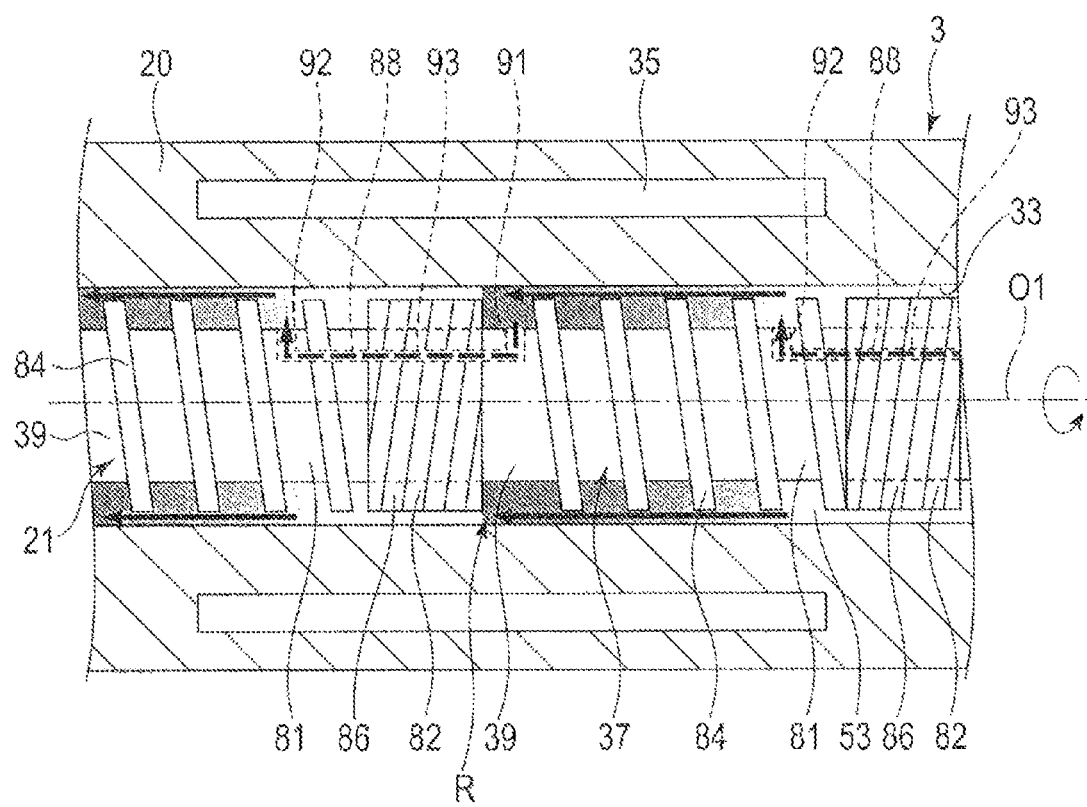
FIG. 18 is a cross-sectional view of the second extruder schematically illustrating the flow direction of the raw materials when the screw rotates in the third embodiment.

Each of the passages 88 has an inlet 91, an outlet 92, and a passage body 93 allowing the inlet 91 to communicate with the outlet 92 as illustrated in FIG. 13, FIG. 14, and FIG. 18. The inlet 91 and the outlet 92 are provided adjacent to both side of one barrier part 82. In another way of understanding, in one transport part 81 neighboring to the two adjacent barrier parts 82, the inlet 91 is open on the outer circumferential surface near the downstream end of the transport part 81 and the outlet 92 is open on the outer circumferential surface near the upstream end of the transport part 81. The passage body 93 does not enable the inlet 91 and the outlet 92 that open on the outer circumferential surface of the one transport part 81 to communicate each other. The inlet 91 communicates with the outlet 92 of the neighboring downstream-side transport part 81 via the barrier part 82, and the outlet 92 communicates with the inlet 91 of the neighboring upstream-side transport part 81 via the barrier part 82.

The raw materials supplied to the second extruder 3 are input to the outer circumferential surface of the transport parts 81 positioned on the proximal end side of the screw body 37 as indicated by the arrow C in FIG. 17. At this time, when the screw 21 rotates to the left and counterclockwise when viewed from the proximal end of the screw body 37, the flight 84 of the transport parts 81 continuously transports the raw materials toward the tip of the screw body 37 as indicated by the solid arrows in FIG. 17.

In the present embodiment, the plurality of transport parts 81 and the plurality of barrier parts 82 are alternately arranged in the axial direction of the screw body 37, and the plurality of passages 88 are arranged having intervals therebetween in the axial direction of the screw body 37. Thus, the raw materials input from the supply port 34 to the screw body 37 are continuously transported from the proximal end to the tip of the screw body 37 while repeatedly receiving the shearing action and extension action in an alternating manner as indicated by the arrows in FIG. 17 and FIG. 18. Therefore, the degree of kneading the raw materials is strengthened and dispersion of the conductive filler in the thermoplastic elastomer of the raw materials is promoted.

In the present embodiment, the raw material transport direction in the transport parts 81 indicated by the solid arrows and the raw material flow direction in the passages 88 indicated by the dashed arrows are the same as illustrated in FIG. 17. In addition, the inlet 91 of the passage 88 is provided near the downstream end of the transport part 81 (on the tip side thereof which is the left side toward FIG. 17), and the outlet 92 is provided near the upstream end of the neighboring transport parts 81 on the downstream side via the barrier part 82. Since a length L2 of the passage 88 straddling the barrier part 82 is set to be short as described above, flow resistance generated when the raw materials pass through the passages 88 can be reduced. Therefore, the present embodiment is appropriate for a method for manufacturing a resin using a raw material with high viscosity. Normally, a raw material containing a filler tends to have high viscosity when it is heated and melted in comparison to a raw material formed only of a resin. Thus, the present embodiment is preferable for a production method for a conductive composite material using raw materials containing a conductive filler and a thermoplastic elastomer.

Although the length L2 of the passage 88 needs to be longer than a length L1 of the barrier part 82 that the passage 88 straddles, it is preferably two times or less, more preferably 1.5 times or less, and even more preferably 1.3 times or less than the length L1 of the barrier part 82 that the passage 88 straddles, in light of lowering flow resistance to the raw materials passing through the passage 88.

In addition, the raw materials that have reached the tip of the screw body 37 turn into a sufficiently kneaded product, are continuously supplied to the third extruder 4 from the discharge port 36a, and gaseous substances and other volatile components included in the kneaded product are continuously removed from the kneaded product.

Fourth Embodiment

FIG. 19 to FIG. 27 disclose a fourth embodiment. The fourth embodiment has the difference relating to the screw body 37 from the first embodiment. Other configurations of the screw 21 are basically similar to those of the first embodiment. Thus, by giving the same reference symbols to the same constituent components of the fourth embodiment as those of the first embodiment, description thereof will be omitted.

Figure 19:
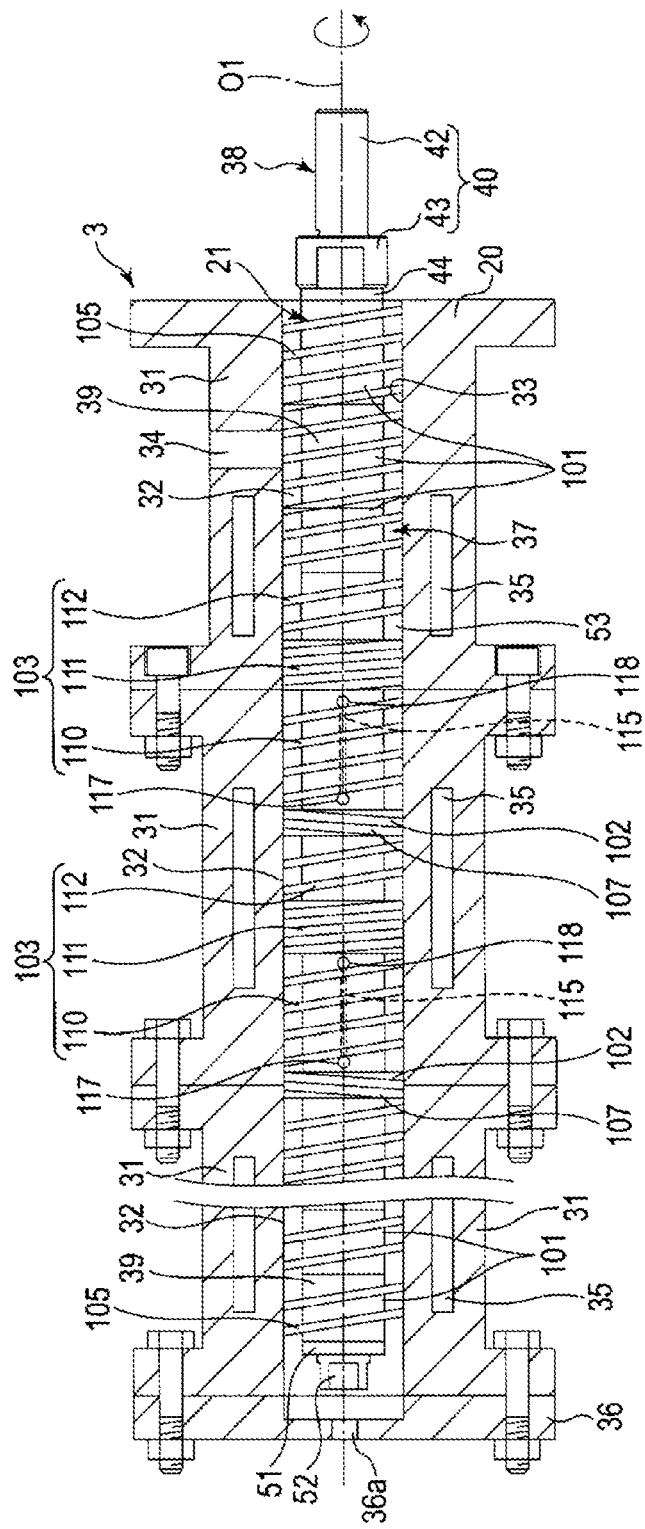
FIG. 19 is a cross-sectional view of a second extruder used in a fourth embodiment of the disclosure.
Figure 20:
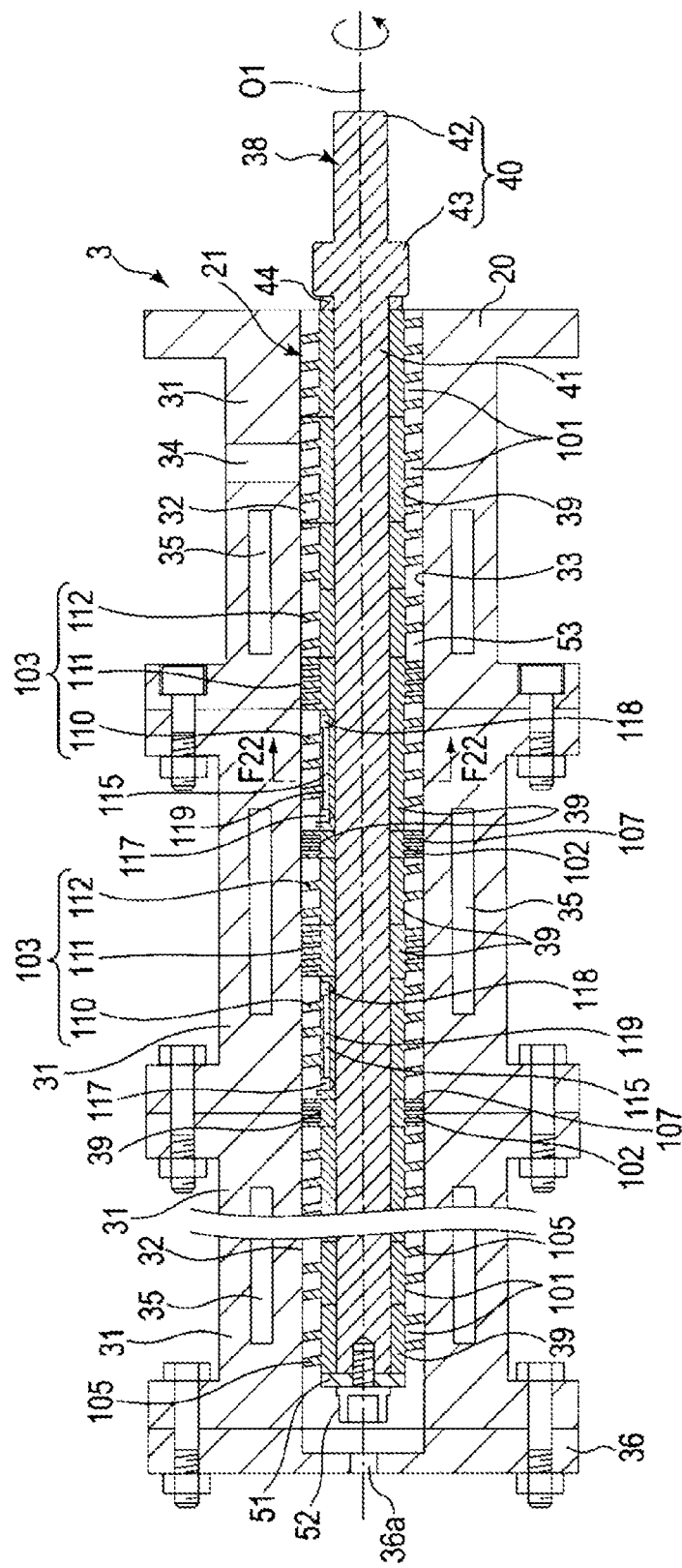
FIG. 20 is a cross-sectional view of the second extruder according to the fourth embodiment in which a barrel and a screw are illustrated together in the cross-section.
Figure 21:
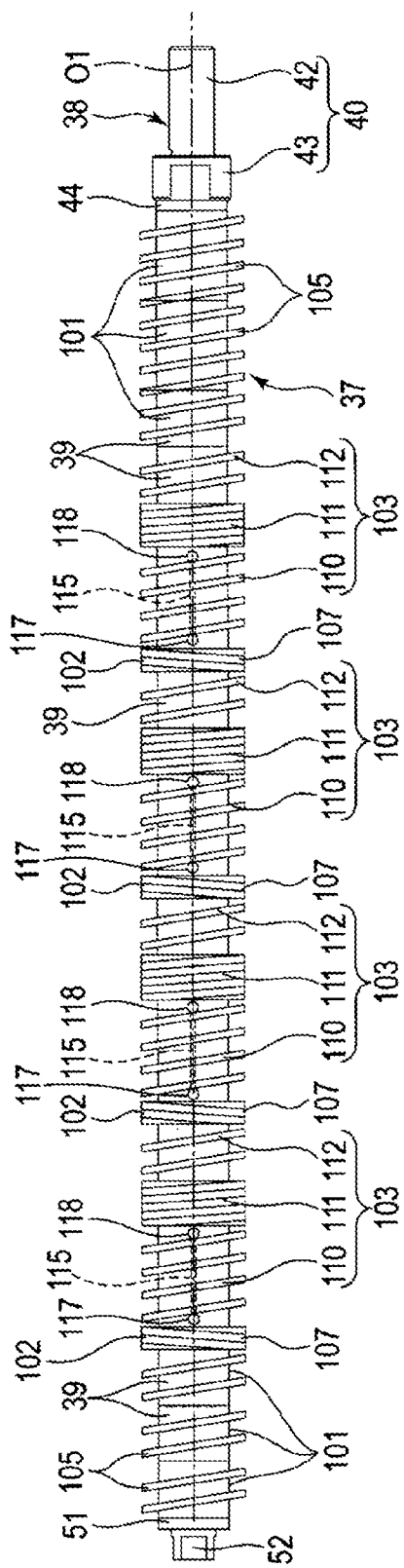
FIG. 21 is a side view of the screw used in the fourth embodiment.

The screw body 37 has a plurality of transport parts 101 for transporting raw materials, a plurality of barrier parts 102 for restricting fluidity of the raw materials, and a plurality of circulation parts 103 for temporarily circulating the raw materials as illustrated in FIG. 19 to FIG. 21. That is, a plurality of transport parts 101 are disposed at the proximal end of the screw body 37 corresponding to one end of the barrel 20, and a plurality of transport parts 101 are disposed at the tip of the screw body 37 corresponding to the other end of the barrel 20. Furthermore, the circulation parts 103 and the barrier parts 102 are alternately disposed side by side in the axial direction between the transport parts 101 from the proximal end to the tip of the screw body 37.

Further, the supply port 34 of the barrel 20 is open toward the transport parts 101 disposed on the proximal end side of the screw body 37.

Each of the transport parts 101 has a spirally twisted flight 105. The flight 105 protrudes from the outer circumferential surface of the tube body 39 in the circumferential direction toward the transport path 53. The flight 105 is twisted such that the raw materials are transported from the proximal end to the tip of the screw body 37 when the screw 21 rotates to the left and counterclockwise when viewed from the proximal end of the screw body 37. That is, the flight 105 is twisted to the right such that the twisting direction of the flight 105 is set to the same as a right-hand screw.

Each of the barrier parts 102 has a spirally twisted flight 107. The flight 107 protrudes from the outer circumferential surface of the tube body 39 in the circumferential direction toward the transport path 53. The flight 107 is twisted such that the raw materials are transported from the tip to the proximal end of the screw body 37 when the screw 21 rotates to the left and counterclockwise when viewed from the proximal end of the screw body 37. That is, the flight 107 is twisted to the left such that the twisting direction of the flight 107 is set to the same as a left-hand screw.

The circulation parts 103 are adjacent to the proximal end side of the rotating shaft 38 with respect to the barrier parts 102. Each of the circulation parts 103 has spirally twisted first to third flights 110, 111, and 112. The first to third flights 110, 111, and 112 each protrude from the outer circumferential surface of the tube body 39 toward the transport path 53.

The first to third flights 110, 111, and 112 are disposed to be adjacent to each other in the axial direction of the screw body 37. The first to third flights 110, 111, and 112 are twisted such that the raw materials are transported from the proximal end to the tip of the screw body 37 when the screw 21 rotates to the left and counterclockwise when viewed from the proximal end of the screw body 37. That is, the first to third flights 110, 111, and 112 are twisted to the right such that the twisting direction of the first to third flights is set to the same as a right-hand screw.

In this case, a twist pitch of the flight 107 of each barrier part 102 is set to be the same as or smaller than a twist pitch of the flight 105 of the transport part 101 and a twist pitch of the flights 110, 111, and 112 of the circulation parts 103. Furthermore, a twist pitch of the second flight 111 is set to be smaller than a twist pitch of the first and third flights 110 and 112. Furthermore, a slight clearance is secured between the apexes of the flights 105, 107, 110, 111, and 112 and the inner circumferential surface of the cylinder part 33 of the barrel 20.

Furthermore, among the first to third flights 110, 111, and 112, the third flight 112 is disposed on the upstream side in the transport direction, and the first flight 110 is disposed on the downstream side in the transport direction. The second flight 111 is disposed between the third flight 112 and the first flight 110.

In the present embodiment, each of the barrier parts 102 is designed such that the raw materials can flow over each of the barrier parts 102. Specifically, each of the barrier parts 102 is designed such that the raw materials can pass between each of the barrier parts 102 and the cylinder part 33 with the screw 21 rotatably inserted into the cylinder part 33 of the barrel 20. In this case, the clearance between the outer diameter part of each of the barrier parts 102 (the apex of the flight 107) and the inner circumferential surface of the cylinder part 33 is preferably set to be in the range of 0.1 mm to 3 mm. More preferably, the clearance is set to be in the range of 0.1 mm to 1.5 mm.

Figure 27:
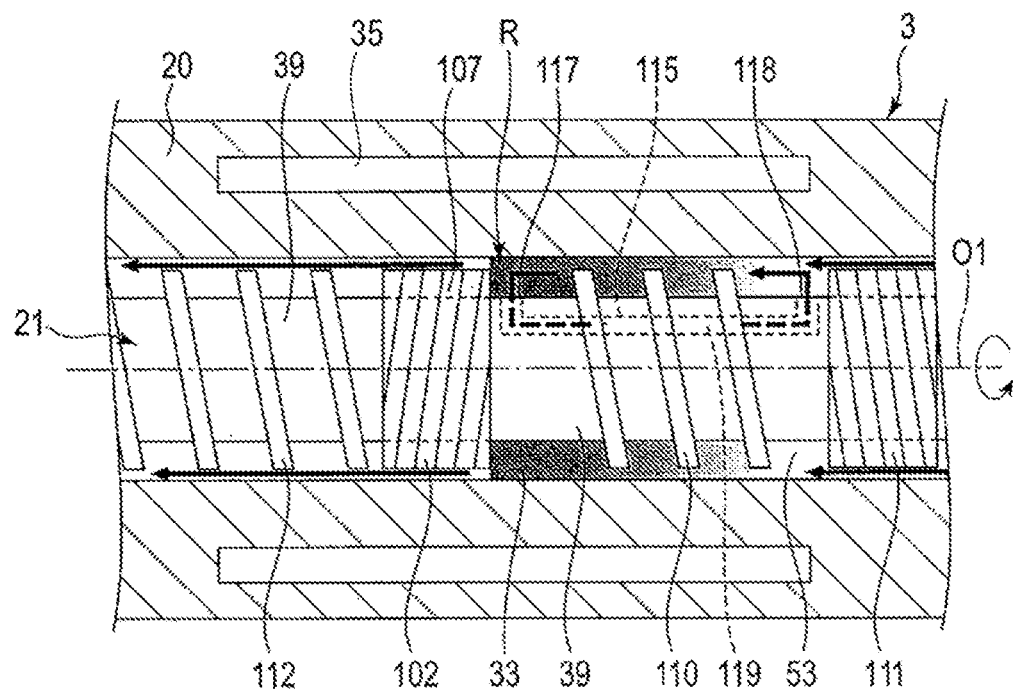
FIG. 27 is a cross-sectional view of the second extruder schematically illustrating the flow direction of the raw materials when the screw rotates in the fourth embodiment.

Each of passages 115 has an inlet 117, an outlet 118, and a passage body 119 allowing the inlet 117 to communicate with the outlet 118 as illustrated in FIG. 19, FIG. 20, and FIG. 27. The inlet 117 and the outlet 118 open on the outer circumferential surface of the tube bodies 39 forming the circulation parts 103. An example of the passages 115 is illustrated in the drawings. The passage body 119 of the passage 115 is provided in the tube body 39 on which the first flight 110 is formed, and the inlet 117 and the outlet 118 open on the outer circumferential surface of the tube body 39. Positions of the openings of the inlet 117 and the outlet 118 can be freely set in the range of the outer circumferential surface of the tube body 39.

The passage body 119 extends linearly in the axial direction of the screw body 37 without branching on the way. As an example, the passage body 119 is illustrated as extending parallel to the axis O1 in the drawings. Both sides of the passage body 119 are axially blocked.

The inlet 117 is provided on one side of the passage body 119, that is, at a part on the tip side of the screw body 37.

The outlet 118 is on the other side (opposite to the one side) of the passage body 119, that is, at a part on the proximal end side of the screw body 37.

Figure 22:
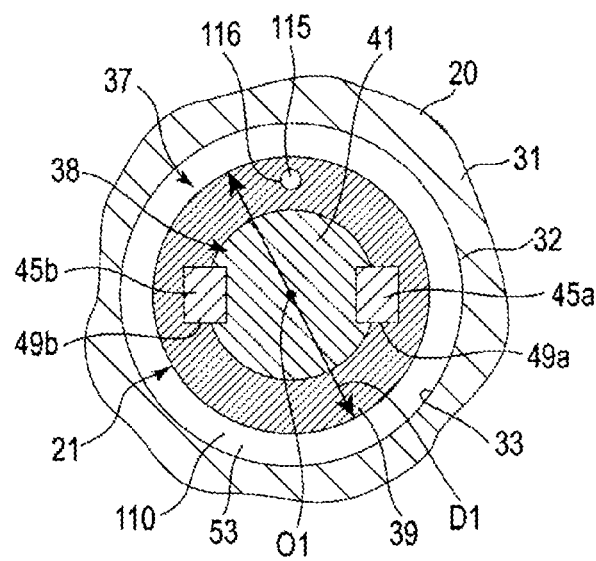
FIG. 22 is a cross-sectional view taken along the line F22-F22 of FIG. 20.
Figure 23:
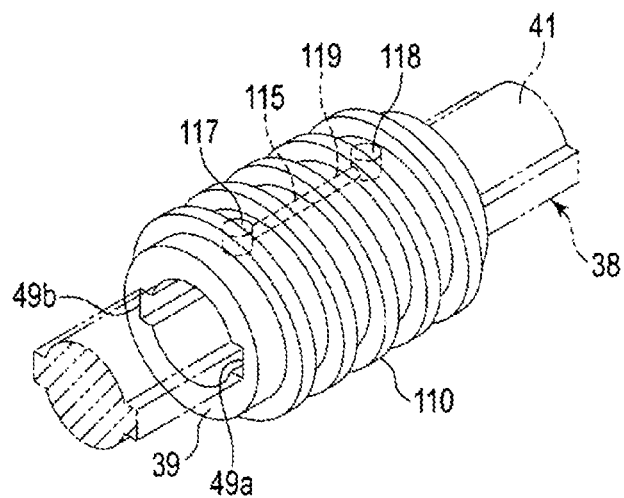
FIG. 23 is a perspective view of a cylindrical body used in the fourth embodiment.
Figure 24:
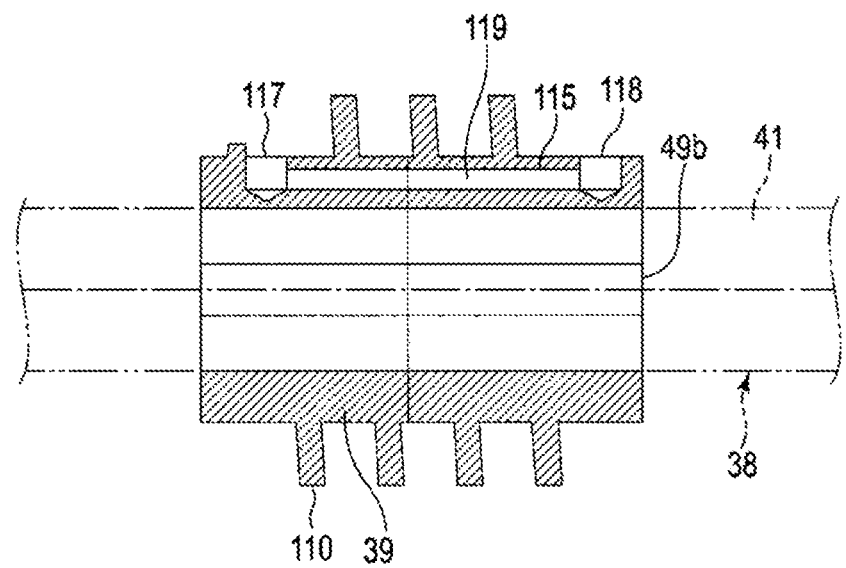
FIG. 24 is a horizontal cross-sectional view of the cylindrical body illustrated in FIG. 23.
Figure 25:
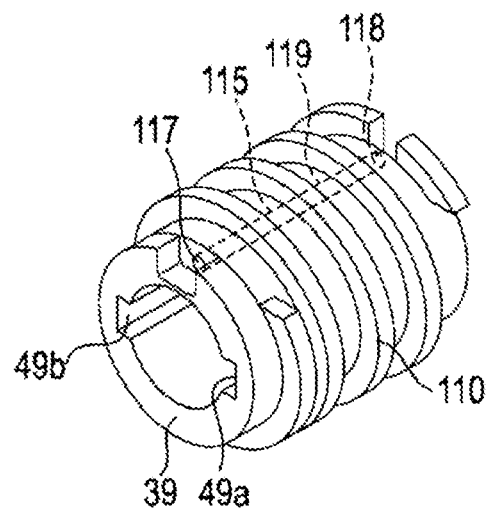
FIG. 25 is a perspective view illustrating another configuration example of the cylindrical body used in the fourth embodiment.

The passage 115 has a hole having, for example, a circular cross-sectional shape as illustrated in FIG. 22. The passage 115 is formed as a hollow space only for allowing the raw materials to flow. A wall surface 61 of the passage 114 revolves around the axis O1 without rotating around the axis O1 when the screw body 37 rotates.

Figure 26:
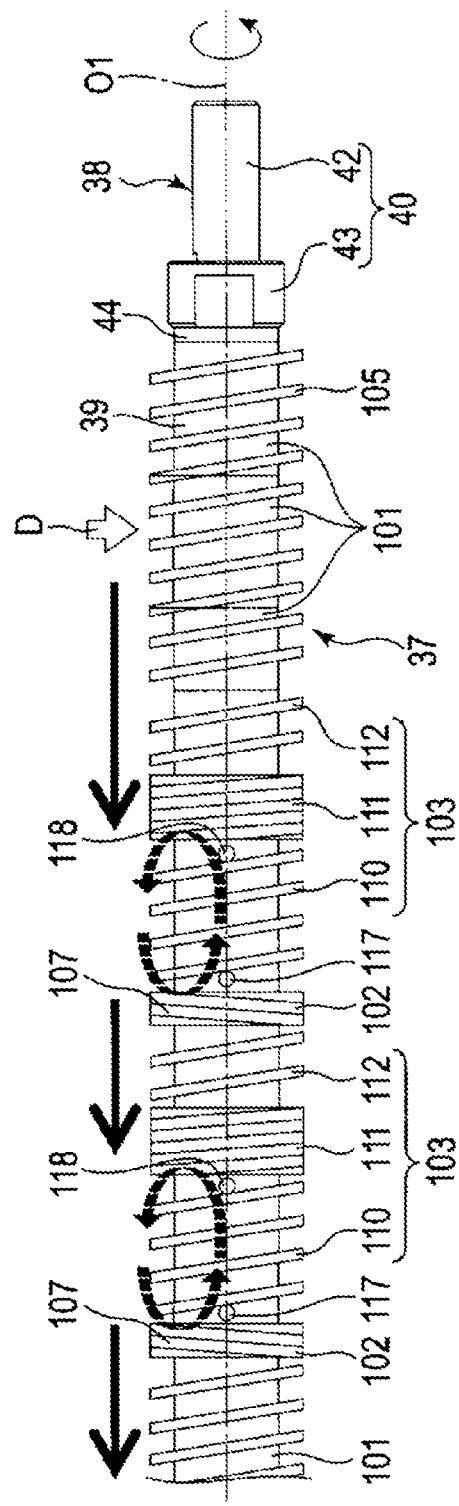
FIG. 26 is a side view illustrating the flow direction of raw materials with respect to the screw in the fourth embodiment.

The raw materials supplied to the second extruder 3 are input to the outer circumferential surface of the transport parts 101 positioned on the proximal end side of the screw body 37 as indicated by the arrow D in FIG. 26. At this time, when the screw 21 rotates to the left and counterclockwise when viewed from the proximal end of the screw body 37, the flights 105 of the transport parts 101 continuously transport the raw materials toward the tip of the screw body 37 as indicated by the solid arrows in FIG. 26.

In the present embodiment, some of the raw materials being transported toward the barrier parts 102 is continuously guided from the inlets 117 to the passages 115 again and temporarily repeats circulation at the circulation parts 103. The remaining raw materials transported toward the barrier parts 102 pass through the clearance between the apexes of the flights 107 of the barrier parts 102 and the inner circumferential surface of the cylinder part 33 and continuously flows into the neighboring circulation parts 103.

Fifth Embodiment

Figure 28:
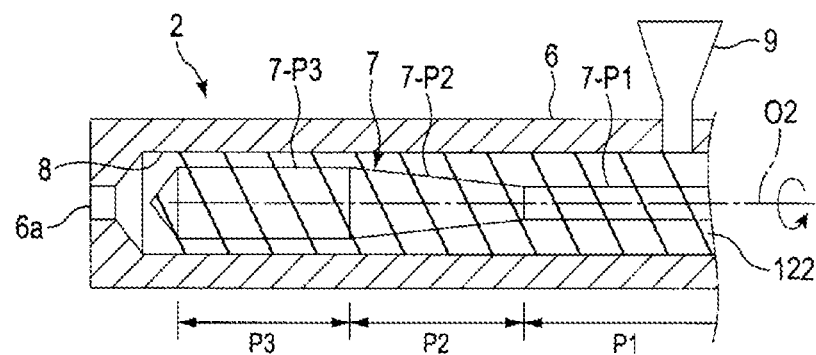
FIG. 28 is a cross-sectional view of a first extruder according to a fifth embodiment of the present embodiment.

FIG. 28 illustrates a fifth embodiment. Although the first extruder (processing machine) 2 is described as a twin-screw kneader in the first embodiment, the first extruder 2 is instead assumed as a single-screw extruder in the fifth embodiment.

In the first extruder 2 according to the fifth embodiment, the barrel 6 includes the cylinder part 8 that houses a single screw 7 so as to be rotatable as illustrated in FIG. 28. The barrel 6 includes, for example, a supply port 9 from which a pelletized material can be supplied into the cylinder part 8, a heater (not illustrated) for melting the resin, and a discharge port 6a from which a molten resin can be discharged, similarly to the above-described first embodiment.

The screw 7 is rotatable with respect to the axis O2, and a spirally twisted flight 122 is formed on the outer circumferential surface of the screw. The flight 122 enables the resin supplied from the supply port 9 to be continuously transported toward the discharge port 6a. Thus, the flight 122 is twisted in the opposite direction to the rotation direction of the screw 7 when viewed from the supply port 9 side. As an example, the flight 122 when the resin is transported by rotating the screw 7 to the left is illustrated in the drawing. In this case, the twist direction of the flight 122 is set to be clockwise to be the same as a right-hand screw.

Furthermore, a supply part P1, a compression part P2, and a transport part P3 are continuously formed on the outer circumferential surface of the screw 7 in this order from the supply port 9 side toward the discharge port 6a. The supply part P1 has a columnar shape and the gap between an outer circumferential surface 7-P1 of the supply part and the cylinder part 8 is set to be wide. The transport part P3 has a columnar shape and an outer circumferential surface 7-P3 of the supply part and the cylinder part 8 is set to be wide narrow. In other words, by setting the gap between the outer circumferential surface 7-P3 and the cylinder part 8 to be narrow in the transport part P3, a height of the flight 122 is set to be low. Accordingly, discharge stability in the discharge port 6a can be improved. The compression part P2 has a shape with an end widening from the supply part P1 to the transport part P3, and the gap between an outer circumferential surface 7-P2 of the compression part and the cylinder part 8 is set to be continuously narrow from the supply part P1 toward the transport part P3.

Here, while the screw 7 rotates to the left, the pelletized resin supplied from the supply port 9 to the cylinder part 8 is transported by the flight 122 from the supply part P1 to the compression part P2 and the transport part P3 in this order and then discharged from the discharge port 6a. In the supply part P1, the resin has a low temperature in a solid state. In the compression part P2, the resin is under compression imposed by the continuously narrowing gap while being heated by a heater. In the transport part P3, the resin constitutes a melted and mixed raw material. Then, the raw materials discharged from the discharge port 6a of the barrel 6 are continuously supplied to the second extruder 3 as indicated by the arrow A in FIG. 1.

According to the fifth embodiment described above, even when the first extruder 2 is set to be a single-screw extruder, a raw material having optimum viscosity can be produced in a kneading process by the second extruder 3, as in the case of the twin-screw kneader according to the first embodiment described above. Accordingly, a burden of the second extruder 3 can be reduced.

For example, assuming a case in which a shearing action and an extension action are applied to a material that has been preliminarily kneaded, that is, a pelletized material in which a filler (additive) has been incorporated into a resin, in an alternating manner, the material can be kneaded by using a single screw extruder, without causing physical properties of the additive to deteriorate and the fibers to be cut.

In addition, when an additive is to be added to the raw materials, if the additive is input into the first extruder 2 or the second extruder 3, deterioration in physical properties and decomposition of the additive are likely to occur due to high-speed rotation of the second extruder 3. In this case, by setting the third extruder 4 to be a twin-screw extruder, not only deaeration but also incorporation (kneading) of the additive into the raw materials is possible.

EXAMPLE

Example 1

In the kneader according to the first embodiment, the transport direction of the raw materials in the transport parts is opposite to the flow direction of the raw materials in the passages, and the inlet and the outlet of each passage straddling each barrier part are provided on the proximal end side of the transport part and the tip side of the transport part adjacent thereto in the order. Thus, since the length of the passage becomes longer and flow resistance imposed on the raw materials passing therethrough becomes higher, it is difficult to knead a raw material having high viscosity while causing it to smoothly pass through the passage.

Thus, in the present Example, the kneader according to the third embodiment in which the transport direction of the raw materials in the transport parts is the same as the flow direction of the raw materials in the passages and the inlet and the outlet of each passage straddling each barrier part are provided on the proximal end side of the transport part and the tip side of the transport part adjacent thereto in the order was used. The kneader is appropriate for kneading a raw material having high viscosity since the passages are short and flow resistance is low.

A conductive composite material was manufactured using the kneader according to the third embodiment by kneading raw materials including a conductive filler and a thermoplastic elastomer by applying a shearing action and an extension action thereto in an alternating manner. In manufacturing of the conductive composite material, two types of materials that are multilayer carbon nanotubes (CNT) serving as a conductive filler and a hydrogenated styrene butadiene-based thermoplastic elastomer (SEBS) serving as a thermoplastic elastomer were supplied to the first extruder 2 for which a ratio of an effective length (L/D) of the kneading part 12 to a screw effective length (L/D) 48 was set to 8, and a molten material was produced by performing preliminary kneading. Then, the molten material was continuously supplied from the first extruder 2 to the second extruder 3 as a raw material of the second extruder 3, and thereby a conductive composite material was manufactured.

Specifications of the screw 21 and the like included in the second extruder 3 were set as follows.

Screw diameter (outer diameter): 48 mm

Screw effective length (L/D): 6.25 to 18.75

Rotational speeds of screw: 200 rpm, 300 rpm, 400 rpm, 500 rpm, 600 rpm, or 1000 rpm Raw material supply amount: 10 kg/hour Barrel set temperature: 250° C.

Cross-sectional shape of inlet, outlet, and passage body: circle having a diameter of 4 mm Number of times of passing through passages (number of repetitions): two, six, or twelve times CNT concentration in raw material: 1 weight %

The conductive composite material was manufactured using the kneader, and the conductivity of the obtained conductive composite material was measured according to JIS K 7194. The result is shown in Table 1.

Three test pieces for measuring conductivity were prepared under the following conditions using hot press equipment. Five points of conductivity were measured for each test piece using a low-resistance resistivity meter. Since five resistivities were calculated for every test piece, 15 resistivities were calculated. The value obtained by averaging the 15 resistivities was set as conductivity.

Preparation conditions: temperature of 260° C. and pressure of 49 MPa

Test piece: a length of 80 mm, a width of 50 mm, and a thickness of 0.5 mm

TABLE 1

| Rotational speed (rotation/minute) | Number of repetitions | | |
|---|---|---|---|
| | Two times | Six times | Twelve times |
| 200 | 6.72E−03 | 7.03E−03 | — |
| 300 | 3.07E−03 | 7.57E−03 | — |
| 400 | 3.18E−03 | 1.15E−02 | 4.65E−03 |
| 500 | 1.39E−02 | 1.44E−02 | 6.25E−03 |
| 600 | 3.18E−03 | 1.85E−02 | 8.03E−03 |
| 1000 | 1.37E−02 | 1.54E−02 | 1.21E−02 |

Figure 29:
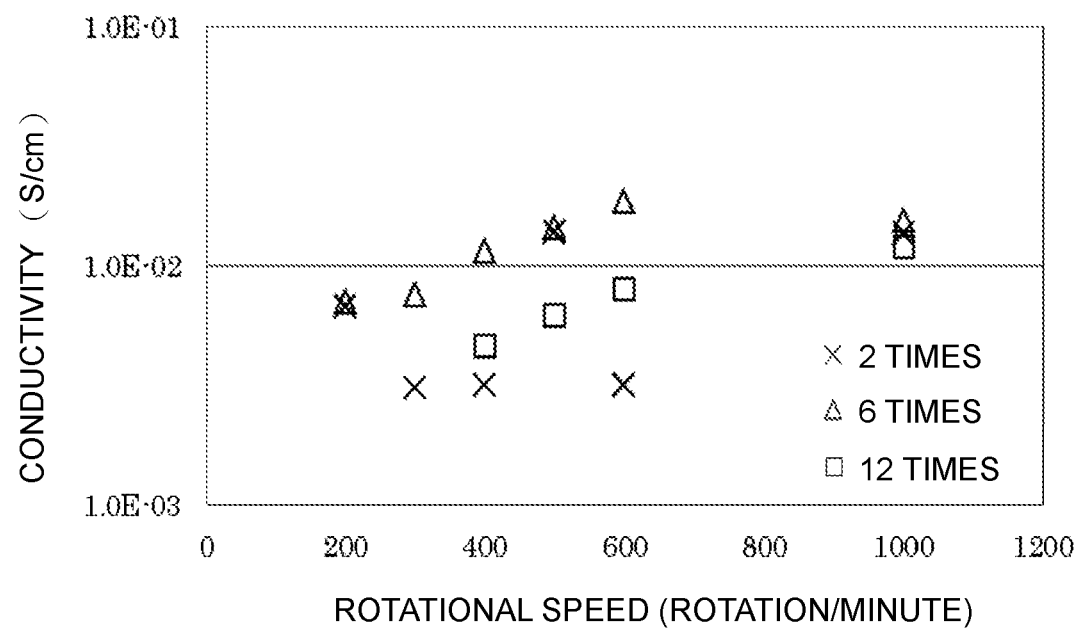
FIG. 29 is a graph showing the influence of the rotational speed of a screw and the number of times of passing through a passage on the conductivity of a conductive composite material.

As indicated in Table 1 and the graph of FIG. 29, the conductive composite material having high conductivity (conductive property) regardless of the rotational speed of the screw could be manufactured. In addition, when the rotational speed of the screw was set to 1000 rpm (rotation/minute), the conductive composite material having high conductivity regardless of the number of passing operations in which the raw materials pass through the passages was obtained. Thus, it can be said that the rotational speed of the screw is preferably set to about 1000 rpm to manufacture the conductive composite material having the high conductivity (conductive property). However, if the rotational speed of the screw for kneading the raw materials including 1 weight % of CNTs and 99 weight % of SEBS is set to 1000 rpm, the temperature of the raw materials becomes very high during the kneading process, which may cause a decrease in strength of the conductive composite material. Thus, when CNTs and SEBS are used as raw materials, the rotational speed of the screw for kneading the raw materials is preferably 600 rpm or lower.

Since the conductivity of the conductive composite material is not affected by the rotational speed of the screw as described above, the conductive composite material having high conductivity is obtained even if the rotational speed of the screw is set to 600 rpm or lower. However, it was found that, when the rotational speed of the screw is set to be in the range of about 200 rpm to 600 rpm, the conductivity of the obtained conductive composite material differs depending on the number of times in which the raw materials passed the passages as illustrated in FIG. 29. That is, it was found that, when the rotational speed of the screw is set to be in the range of about 200 rpm to 600 rpm, the conductivity of the conductive composite material is affected by the number of times of passing through passages.

The kneader used in the present Example having the inlets, the outlets, and the passage bodies of the passages that are holes in a circular cross-sectional shape and formed in the circular shape having an inner diameter of 4 mm enabled the molten raw materials to smoothly pass through the passages. However, a kneader having holes of the inlets, the outlets, and the passage bodies of the passages formed in a circular shape having an inner diameter of 2 mm could not enable the raw materials to smoothly pass through the passages. Thus, if the cross-sectional shapes of the inlets, the outlets, and the passage bodies of the passages are set to be circular shape, the diameter thereof is preferably 2 mm or greater, more preferably 3 mm or greater, and even more preferably 4 mm or greater.

Example 2

A conductive composite material was manufactured using the same kneader as in Example 1, and the rotational speed of the screw was fixed to 400 rpm, the number of times of passing through passages was set to 4 times, 8 times, and 10 times, and conductivity of the obtained conductive composite material was measured in the same manner as in Example 1.

TABLE 2

| | Conductivity (S/cm) | | | | | |
|---|---|---|---|---|---|---|
| | Number of repetitions | | | | | |
| | 2 | 4 | 6 | 8 | 10 | 12 |
| Average | 3.18E−03 | 1.23E−02 | 1.05E−02 | 1.15E−02 | 1.07E−02 | 4.65E−03 |
| Standard deviation | 1.07E−03 | 3.27E−03 | 2.65E−03 | 2.95E−03 | 2.87E−03 | 2.10E−03 |

Figure 30:
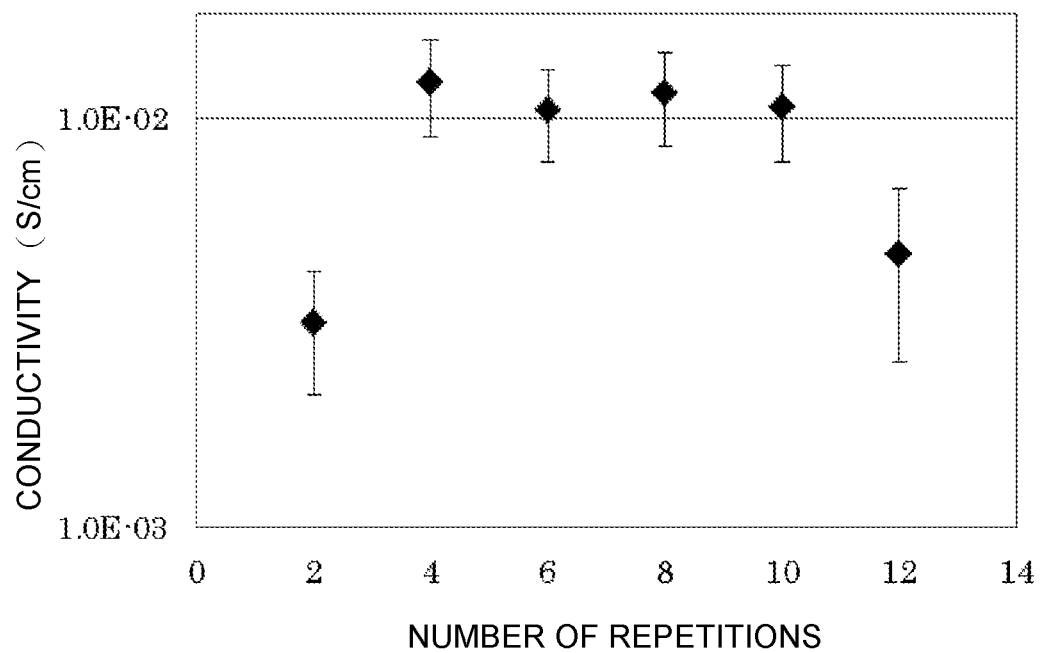
FIG. 30 is a graph showing the relationship between the number of times of passing through passages and the conductivity of a conductive composite material.

Table 2 and the graph of FIG. 30 show the measurement results of the conductivity of the conductive composite materials obtained in Examples 1 and 2. When the number of times of passing through passages was increased from 2 times to 4 times, the conductivity of the conductive composite materials sharply increased. The reason for this is considered that, when the number of times of passing through passages was increased, dispersibility of CNTs included in SEBS became higher. Based on the results, the number of times of passing through passages is considered to be preferably 2 times or more, more preferably 3 times or more, and even more preferably 4 times or more to obtain a conductive composite material having high conductivity.

In addition, when the number of times of passing through passages was increased from 10 times to 12 times, the conductivity of the obtained conductive composite materials became lower. The reason for this is considered that increasing the number of times of passing through passages caused deterioration in the function of CNTs dispersed in SEBS as a conductive filler. Based on the result, the number of times of passing through passages is considered to be preferably 16 times or fewer, more preferably 11 times or fewer, and even more preferably 10 times or fewer to obtain a conductive composite material having high conductivity.

As described above, it was found with respect to the production method of the disclosure that the number of times in which the raw materials pass the passages affects the dispersibility of CNTs and conductive function of a conductive filler. It can be said that the number of times of passing through passages is preferably from 3 times to 11 times and more preferably from 4 times to 10 times to manufacture a conductive composite material having high conductivity by highly dispersing CNTs in SEBS while maintaining its function as a conductive filler.

Example 3

Conductive composite materials was manufactured by fixing the rotational speed of the screw of a similar kneader to that of Example 1 to 400 rpm and changing the number of times of passing through passages and the concentration of CNTs in the materials as follows, and the conductivity thereof was measured. The result is shown in Table 3.

Number of times of passing through passages: 4 times, 6 times, 8 times, 10 times, and 12 times Concentrations of CNTs in the materials: 0.50 weight %, 0.75 weight %, 1.0 weight %, 1.25 weight %, 1.5 weight %, 2.0 weight %, and 3.0 weight %

TABLE 3

| | Conductivity (S/cm) | | | | | |
|---|---|---|---|---|---|---|
| | Number of repetitions | | | | | |
| CNT (wt %) | 2 times | 4 times | 6 times | 8 times | 10 times | 12 times |
| 0.50 | — | 6.49E−08 | 8.07E−06 | 1.97E−05 | 1.38E−05 | — |
| 0.75 | — | 3.37E−03 | 1.71E−03 | 2.45E−03 | 2.34E−03 | — |
| 1.00 | 3.18.E−03 | 1.23E−02 | 1.05E−02 | 1.15E−02 | 1.07E−02 | 4.65E−03 |
| 1.25 | — | 2.83E−02 | 2.39E−02 | 2.38E−02 | 2.39E−02 | — |
| 1.50 | — | 4.70E−02 | 3.47E−02 | 3.77E−02 | 4.61E−02 | — |
| 2.00 | — | 9.51E−02 | 7.69E−02 | 7.68E−02 | 8.85E−02 | — |
| 3.00 | — | 2.08E−01 | 1.88E−01 | 1.99E−01 | 1.86E−01 | — |

Figure 31:
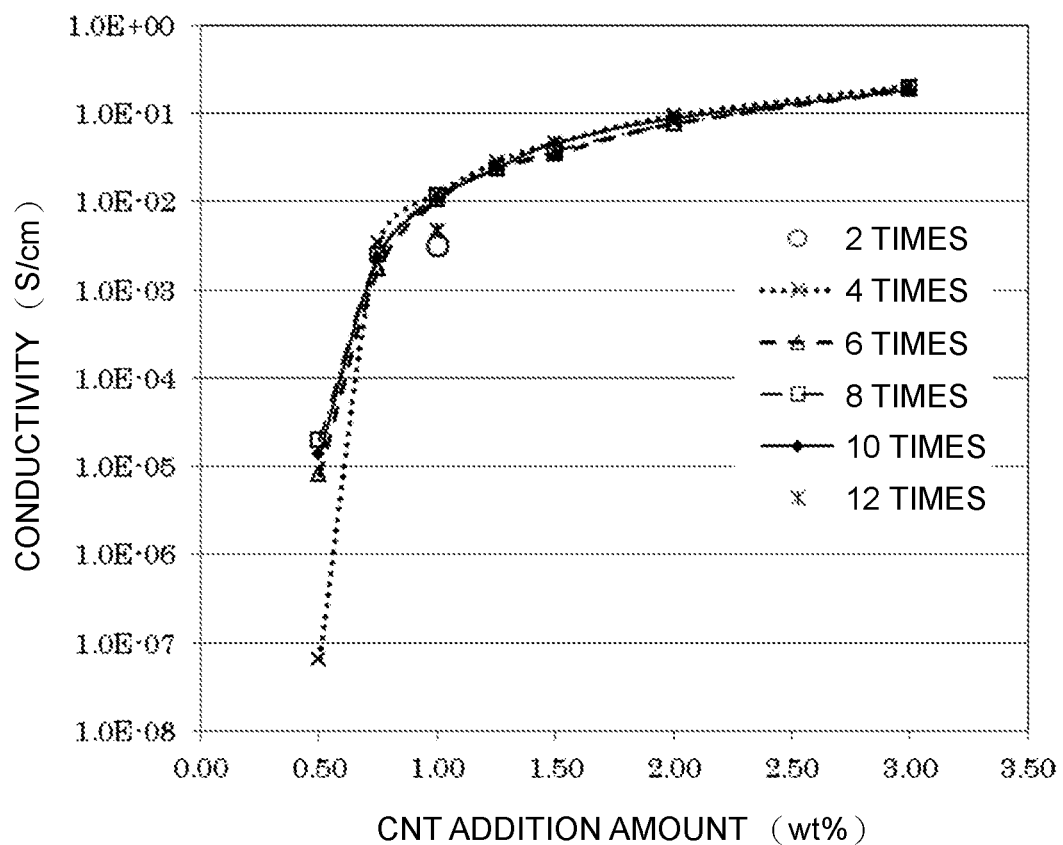
FIG. 31 is a graph showing the relationship between CNT addition amounts and the conductivity of a conductive composite material.

As shown in Table 3 and the graph of FIG. 31, the conductive composite materials having high conductivity were obtained by setting the number of times of passing through passages to 4 times or more when the concentration of CNTs in the materials was set to 0.75 weight % or higher. However, when the concentration of CNTs in the materials was set to 0.50 weight %, the conductivity of the conductive composite material for which the number of times of passing through passages was 4 times was remarkably lower than that of the conductive composite material for which the number of times of passing through passages was 6 times. Based on the result, it can be said that the number of times of passing through passages is preferably 5 times or more and more preferably 6 times or more to stably manufacture a conductive composite material having high conductivity using a material at a low concentration of CNTs.

Example 4

The tensile strength was measured for conductive composite materials obtained by fixing the rotational speed of the screws of the kneaders of Examples 1 and 2 to 400 rpm and setting the number of times of passing through passages to 2 times, 4 times, 6 times, 8 times, 10 times, and 12 times according to JIS K 6251. The result is shown in Table 4.

Sheets cut in a test piece shape were prepared using a method of hot press equipment that is the same as that for the conductivity test pieces. The shape was No. 3 dumbbell shape. In the tensile test, the crosshead speed was set to 100 mm/minute and a load was applied until the test pieces fracture using a universal testing machine (Autograph AG-50kN manufactured by Shimadzu Corporation). The tensile strength was calculated using the following calculation formula.

$$F = P/W \times D$$

F: strength (MPa)
P: breaking load (MPa)
W: widths of test pieces (mm)
D: thickness of test pieces (mm)

TABLE 4

| | Tensile strength (MPa) | | | | | |
|---|---|---|---|---|---|---|
| | Number of repetitions | | | | | |
| | 2 | 4 | 6 | 8 | 10 | 12 |
| Average | 35.8 | 33.0 | 32.3 | 29.7 | 31.7 | 28.5 |
| Standard deviation | 2.01 | 2.01 | 0.75 | 1.46 | 2.35 | 2.31 |

Figure 32:
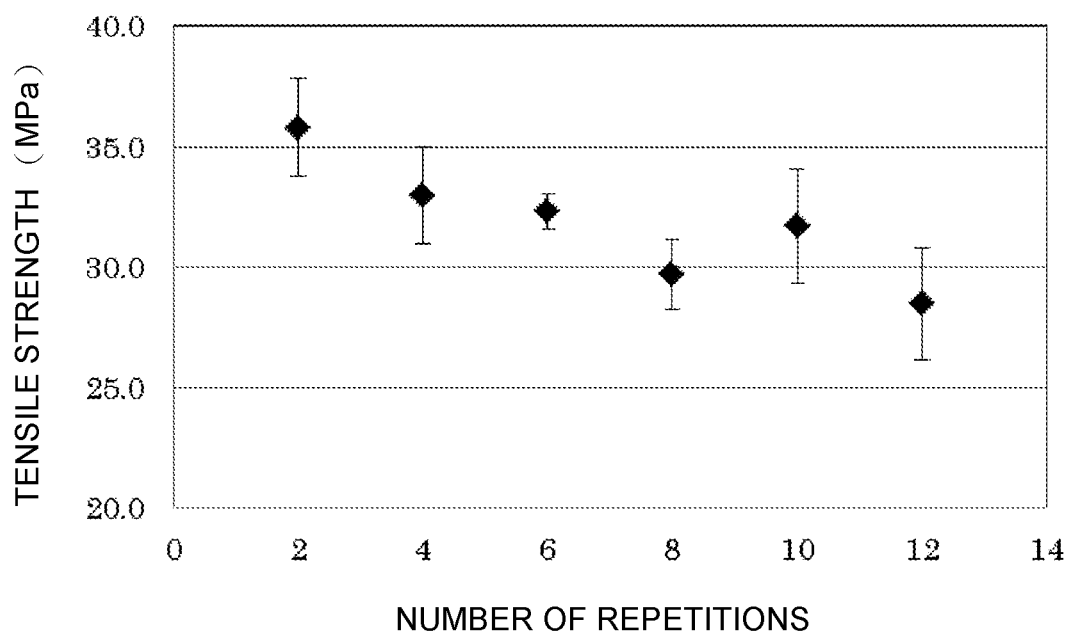
FIG. 32 is a graph showing the relationship between the number of times of passing through passages and tensile strength of a conductive composite material.

As shown in Table 4 and FIG. 32, the conductive composite materials for which the number of times of passing through passages was 6 times, 8 times, and 10 times have substantially the same tensile strength, and the conductive composite material for which the number of times of passing through passages was 12 times had lower tensile strength. Based on the result, it can be said that the number of times of passing through passages is preferably 11 times or fewer and more preferably 10 times or fewer to obtain a conductive composite material having high tensile strength.

Example 5

A conductive composite material was manufactured by kneading raw materials using the kneader according to the fourth embodiment instead of the kneader according to the third embodiment, and the conductivity of the obtained conductive composite material was measured. The result of Example 5 obtained by using the kneader according to the fourth embodiment and the result of Example 1 obtained by using the kneader according to the third embodiment are shown in Table 5.

The specifications of the screw 21 and the like included in the second extruder 3 were set as follows.

Screw diameter (outer): 36 mm
Screw effective length (L/D): 12.5
Rotational speed of the screw: 400 rpm, 500 rpm, and 600 rpm
Raw material supply amount: 10 kg/hour
Barrel set temperature: 250° C.
Shape of inlet and outlet: circle having a diameter of 4 mm
Number of times of passing through passages (number of repetitions): 6
Concentration of CNTs in the raw materials: 1 weight %

TABLE 5

| | Conductivity (S/cm) | |
|---|---|---|
| RPM (rotation/minute) | Example 1 | Example 5 |
| 200 | 7.03E−03 | — |
| 300 | 7.57E−03 | — |
| 400 | 1.15E−02 | 8.23E−03 |
| 500 | 1.44E−02 | 8.41E−03 |

TABLE 5-continued

| | Conductivity (S/cm) | |
|---|---|---|
| RPM (rotation/minute) | Example 1 | Example 5 |
| 600 | 1.85E−02 | 9.74E−03 |
| 1000 | 1.54E−02 | 1.28E−02 |

Figure 33:
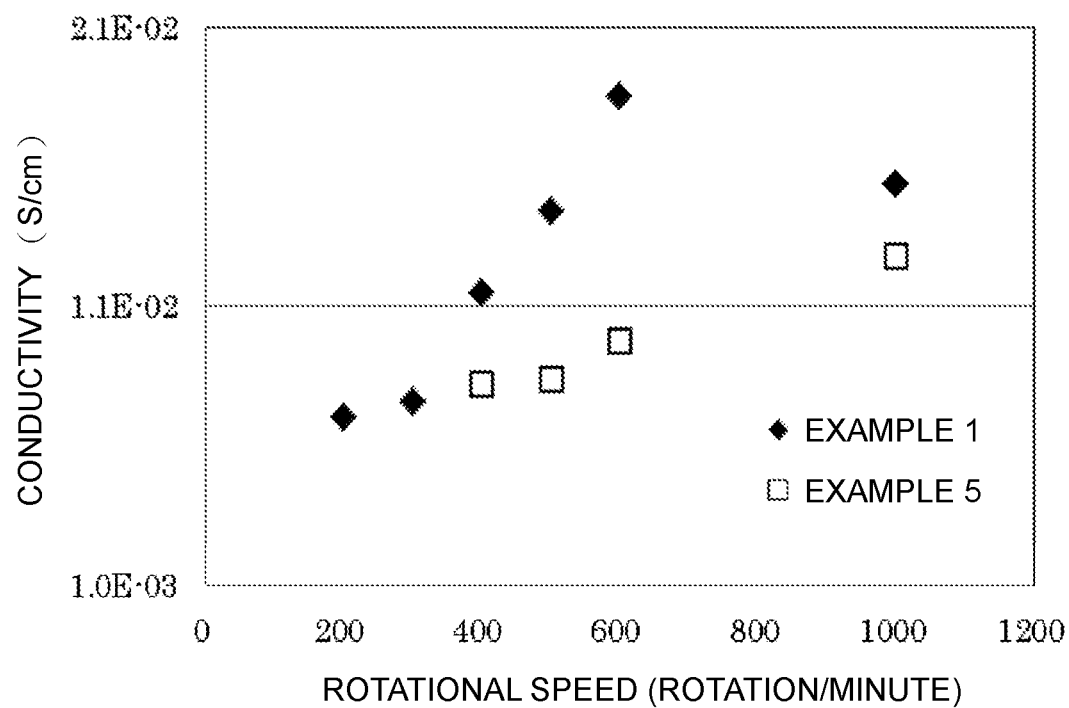
FIG. 33 is a graph showing the influence of a difference in passage configurations in a continuous kneader on the conductivity of a conductive composite material.

FIG. 33 illustrates the conductivity of the conductive composite materials obtained using the production methods of Examples 1 and 5. As shown in the drawings and Table 5, the conductive composite material having higher conductivity was obtained by using the kneader according to the third embodiment than by using the kneader according to the fourth embodiment. Based on the result, it can be said that it is preferable to use the kneader with the configuration according to the third embodiment, that is, the configuration in which each inlet is provided at the proximal end-side transport part and each outlet is provided at the tip-side transport part among the adjacent transport parts via the barrier parts, the passages allowing the inlets to communicate with the outlets are provided to straddle the barrier parts, and the raw materials are transported in the transport parts from the proximal end toward the tip of the screw body and circulates inside the passages from the proximal end toward the tip of the screw body, in light of manufacturing a conductive composite material having high conductivity.

Example 6

A conductive composite material was manufactured with the number of repetitions set to 6 times using a kneader that is different from the kneader used in Example 1 only in that a cross-sectional shape of inlets, outlets, and passage bodies was set to a circle having a diameter (inner) of 2 mm, among the specifications of the screw 21 and the like included in the second extruder 3, and the conductivity of the obtained conductive composite material was measured according to JIS K 7194. The result of Example 6 in which the cross-sectional shape of the passages was set to the circle having a diameter of 2 mm and the result of Example 1 in which the cross-sectional shape of the passages was set to a circle having a diameter of 4 mm and the number of repetitions was 6 are shown together in Table 6.

TABLE 6

| | Conductivity (S/cm) | |
|---|---|---|
| RPM (rotation/minute) | Example 6 (2 mm) | Example 1 (4 mm) |
| 200 | — | 7.03E−03 |
| 300 | 3.70E−03 | 7.57E−03 |
| 400 | 7.09E−03 | 1.15E−02 |
| 500 | 7.91E−03 | 1.44E−02 |
| 600 | 1.10E−02 | 1.85E−02 |
| 1000 | 1.18E−02 | 1.54E−02 |

Figure 34:
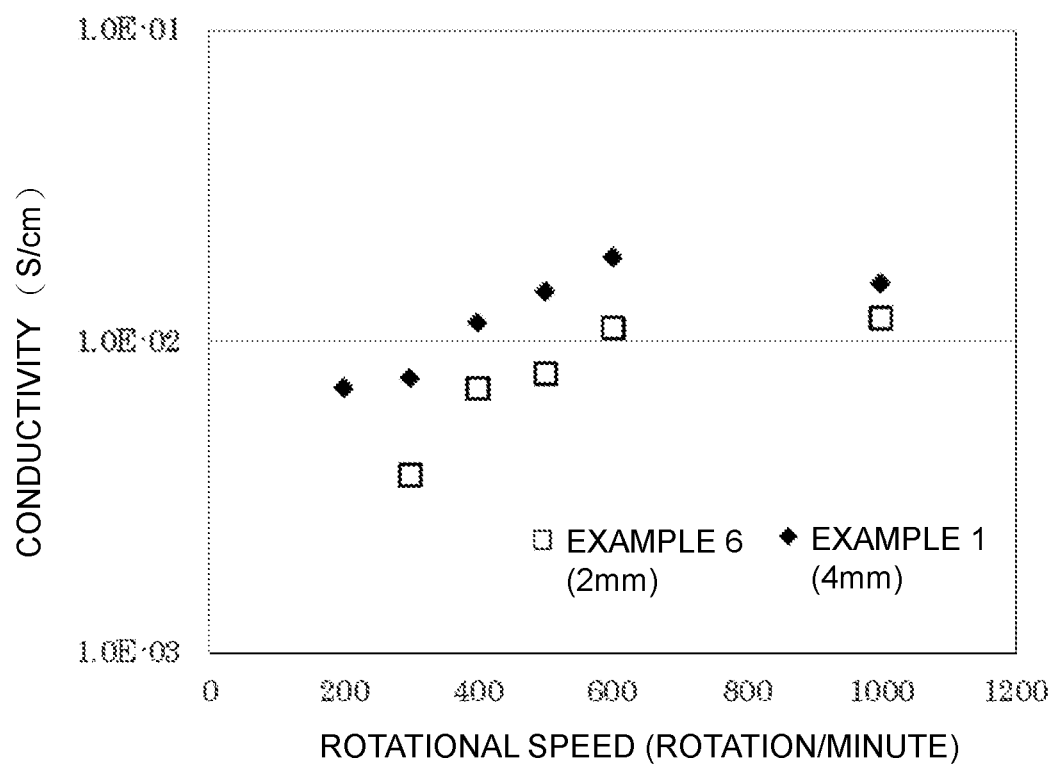
FIG. 34 is a graph showing the influence of the diameter of the circle of a passage cross-section of a continuous kneader on the conductivity of a conductive composite material.

As shown in Table 6 and FIG. 34, the conductive composite material having slightly lower conductivity than that of the conductive composite material obtained in Example 1 was obtained in Example 6, similarly to Example 5. This result is considered that, if the inner diameter of the passage cross-section is set to 2 mm in the kneader having a screw diameter of 48 mm, the inner diameter is narrow with respect to the screw diameter, and thus the resin is difficult to flow in the passages, most of the resin gets stuck before the barrier parts, the pressure increases, and thus the molten resin raw material gets over the barrier parts. Based on the result, it can be said that, in a kneader having a screw diameter of about 30 to 50 mm, an inner diameter of an inlet, an outlet, and a passage body of a passage (a diameter of circular cross-sections) is preferably about 3 mm to 5 mm.

Based on the results of Examples 5 and 6, the kneader according to the fourth embodiment in which the inlets and the outlets of the passages are provided in the same transport part manufactured a conductive composite material having lower conductivity than the kneader according to the third embodiment in which the inlets and the outlets of the passages are provided in different adjacent transport parts having the barrier parts therebetween. The reason for this is considered that an excessive shear force was applied to the conductive filler intruding the gap with the cylinder part wall surface in the form of getting over the barrier parts, and thus the conductive filler was not able to maintain a long-connected fibrous state and exhibit conductivity. In addition, when the raw materials intrude into the gap with the cylinder part wall surface, an excessive shear force is likely to be applied to the resin (thermoplastic elastomer) included in the raw materials causing shear heating, and thus the resin is likely to deteriorate. Therefore, from the viewpoint of manufacturing a conductive composite material having satisfactory tensile strength and conductivity, it is preferable to use the kneader according to the third embodiment in which the raw materials pass through the passages and move between the transport parts.

Comparative Example 1

A conductive composite material was manufactured using a material containing CNTs at the concentration of 1.25 weight %, 2.5 weight %, and 5.0 weight % and SEBS using a batch kneader described in Patent Document 2 (Japanese Patent Laid-Open No. 2008-266577), and conductivity thereof was measured. The measurement result and the result of Example 3 in which the number of repetitions was 6 are shown together in Table 7.

TABLE 7

| | Conductivity (S/cm) | |
|---|---|---|
| Weight of CNT (wt %) | Example 3 | Comparative example 1 |
| 0.50 | 8.07E−08 | — |
| 0.75 | 1.71E−03 | — |
| 1.00 | 1.05E−02 | — |
| 1.20 | — | 1.30E−07 |
| 1.25 | 2.39E−02 | — |
| 1.50 | 3.47E−02 | — |
| 2.00 | 7.69E−02 | — |
| 2.50 | — | 4.00E−03 |
| 3.00 | 1.88E−01 | — |
| 5.00 | — | 1.20E−01 |

Figure 35:
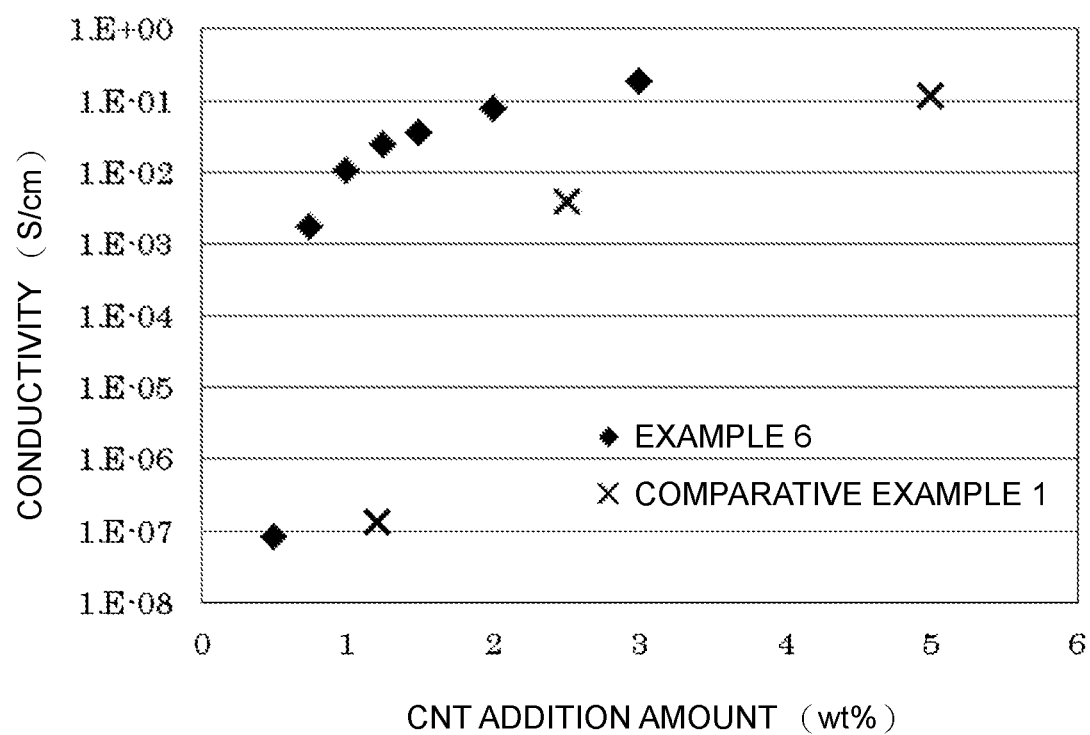
FIG. 35 is a graph showing the influence of a difference between kneaders on the conductivity of a conductive composite material.

As shown in Table 7 and FIG. 35, the conductive composite material of Comparative example 1 showed lower conductivity than the conductive composite material of Example 3 in which the concentration of CNTs was similar. According to the production method of the disclosure, a blending amount of CNTs necessary for forming a conductive composite material having high conductivity can be reduced.

In addition, according to the graphs of FIG. 33 and FIG. 35, while the conductive composite material of Example 5 manufactured using the kneader having the screw diameter of 36 mm showed slightly lower conductivity than the conductive composite material of Example 3 manufactured using the kneader having the screw diameter of 48 mm, it had sufficiently high conductivity than that obtained from the batch kneader of Comparative example 1. Based on the result, it can be said that a conductive composite material having equivalent conductivity is obtained if a screw diameter (outer) of a kneader is in the range of 30 mm and 50 mm.

What is claimed is:

1. A production method for a conductive composite material, comprising:
    a preliminarily kneading step for kneading and melting a raw material containing a conductive filler and a thermoplastic elastomer;
    a dispensing step for repeatedly applying a shearing action and an extension action to the raw material while rotating a screw body of a single-screw extruder and transporting the raw materials in a melted state from a proximal end to a tip of the single-screw extruder; and
    a discharging step for continuously discharging a conductive composite material from the tip of the single-screw extruder,
    wherein in the dispensing step,
    the shearing action caused by a difference in speeds of a flight of the screw body swirling along a transport path and an inner circumferential surface of a cylinder part of a barrel for housing the screw body is applied to the raw material, and
    the extension action is applied to the raw material by passing the raw material through a passage which is provided inside the screw body and has an inlet and an outlet opened on an outer circumferential surface of the screw body.

2. The production method for a conductive composite material according to claim 1, wherein
    in the dispensing step, a transportation of the raw material is limited by a barrier part provided between the inlet and the outlet, a raw material reservoir in which a filling proportion of the raw material is 100% is formed, a pressure of the raw material is increased, and the raw material in the melted state in the raw material reservoir is flowed into the inlet.

3. The production method for a conductive composite material according to claim 1, wherein
    in the dispensing step, a rotational speed of the screw body is 200 rpm to 600 rpm.

4. The production method for a conductive composite material according to claim 3, wherein
    in the dispensing step, the number of times of applying the shearing action and the extension action to the raw material is from 4 times to 10 times.

5. The production method for a conductive composite material according to claim 1, wherein
    the inlet, the outlet, and the passage are holes having a circular cross-sectional shape, and an inner diameter of the holes is 2 mm or greater and smaller than 8 mm.

6. The production method for a conductive composite material according to claim 1, wherein
    wherein the conductive filler is carbon nanotubes and/or carbon black, and
    wherein the thermoplastic elastomer is a hydrogenated styrene butadiene-based thermoplastic elastomer.

7. The production method for a conductive composite material according to claim 6,
    wherein a content of the carbon nanotubes in the conductive composite material is 0.1 to 30 weight %.

\* \* \* \* \*